(12) United States Patent
Liu et al.

(10) Patent No.: US 10,783,657 B2
(45) Date of Patent: Sep. 22, 2020

(54) METHOD AND APPARATUS FOR VEHICLE POSITION DETECTION

(71) Applicants: Neusoft Corporation, Shenyang (CN); Neusoft Reach Automotive Technology (Shanghai) Co., Ltd., Shanghai (CN)

(72) Inventors: Wei Liu, Shenyang (CN); Ting Zhou, Shenyang (CN); Huai Yuan, Shenyang (CN); Jin Lv, Shenyang (CN); Hao Chen, Shenyang (CN); Yizhong Fan, Shenyang (CN)

(73) Assignees: NEUSOFT CORPORATION, Shenyang (CN); NEUSOFT REACH AUTOMOTIVE TECHNOLOGY (SHANGHAI) CO., Shanghai (CN)

( * ) Notice: Subject to any disclaimer, the term of this patent is extended or adjusted under 35 U.S.C. 154(b) by 108 days.

(21) Appl. No.: 16/112,656

(22) Filed: Aug. 25, 2018

(65) Prior Publication Data

US 2019/0347819 A1   Nov. 14, 2019

(30) Foreign Application Priority Data

May 9, 2018   (CN) .......................... 2018 1 0438659

(51) Int. Cl.
*G06T 5/00*  (2006.01)
*G06T 7/20*  (2017.01)
*G06T 7/70*  (2017.01)

(52) U.S. Cl.
CPC ............... *G06T 7/70* (2017.01); *G06T 5/006* (2013.01); *G06T 7/20* (2013.01); *G06T 2207/30252* (2013.01)

(58) Field of Classification Search
None
See application file for complete search history.

(56) References Cited

U.S. PATENT DOCUMENTS

| 5,666,227 A | 9/1997 | Ben-Ghiath |
| 2017/0208207 A1 | 7/2017 | Liu et al. |

(Continued)

FOREIGN PATENT DOCUMENTS

| CN | 103631698 A | 3/2014 |
| CN | 105711501 A | 6/2016 |

(Continued)

OTHER PUBLICATIONS

European Search Report dated Mar. 8, 2019 in the corresponding EP application (application No. 18182955.7).

(Continued)

*Primary Examiner* — Idowu O Osifade
(74) *Attorney, Agent, or Firm* — Kilpatrick Townsend & Stockton, LLP

(57) ABSTRACT

A method and an apparatus for vehicle position detection are provided. An image collecting device installed on a target vehicle is used to capture a region in front of the target vehicle at a current moment under a fixed viewing angle, to acquire a real image. Then, a virtual image under a preset viewing angle is generated based on the real image. The virtual image includes effective features of a side vehicle, and the side vehicle is accurately recognized based on the effective features, thereby determining position information of the side vehicle, so as to prevent accidents such as a collision between the target vehicle and the side vehicle.

20 Claims, 13 Drawing Sheets

(56) References Cited

U.S. PATENT DOCUMENTS

| | | |
|---|---|---|
| 2017/0254659 A1 | 9/2017 | Fukumoto |
| 2017/0371340 A1 | 12/2017 | Cohen et al. |
| 2018/0033148 A1 | 2/2018 | Zheng et al. |
| 2019/0041513 A1 | 2/2019 | Chen |
| 2019/0294897 A1* | 9/2019 | Cohen ................ G06K 9/00825 |

FOREIGN PATENT DOCUMENTS

| | | |
|---|---|---|
| CN | 107577988 A | 2/2018 |
| JP | 2004157999 A | 6/2004 |
| JP | 2015219631 A | 12/2015 |
| JP | 2017130929 A | 7/2017 |
| JP | 2018018483 A | 2/2018 |
| WO | 2018051810 A1 | 3/2018 |

OTHER PUBLICATIONS

Nicolas Blanc et al., "LaRASidieCam: a Fast and Robust Vision-Based Blindspot Detection System", Istanbul, Turkey, Jun. 13-15, 2007, 6 pages.

JP First Office Action dated Sep. 3, 2019 in the corresponding JP application (application No. 2018-146866).

CN First Office Action dated Aug. 3, 2020 in the corresponding on application (application No. 201810438659.3).

* cited by examiner

METHOD AND APPARATUS FOR VEHICLE POSITION DETECTION

The present application claims priority to Chinese Patent Application No. 201810438659.3, titled "METHOD AND APPARATUS FOR VEHICLE POSITION DEFECTION", filed on May 9, 2018 with the State Intellectual Property Office of People's Republic of China, which is incorporated herein by reference in its entirety.

TECHNICAL FIELD

The present disclosure relates to the technical field of detection, and in particular, to a method and an apparatus for vehicle position detection.

BACKGROUND

When a driver is driving a vehicle, a forward collision warning (FCW) system or an adaptive cruise control (ACC) system can detect another vehicle in front of the subject vehicle driven by the driver, in a case that such system is installed on the subject vehicle, so as to avoid a collision between the subject vehicle and the vehicle in front of the subject vehicle.

The FCW system is capable to timely detect another vehicle in a front region of the subject vehicle. In one embodiment, in a case that there is another vehicle in the front region of the subject vehicle, the FCW system warns the driver with light, sound, vibration and the like, so as to ensure driving safety of the subject vehicle. The ACC system is capable to adapt to traffic conditions by adjusting a speed of the vehicle, so as to achieve automatic deceleration or acceleration without intervention of the driver. In one embodiment, the ACC system detects whether there is a slower vehicle in the way of the subject vehicle via radar installed in the front of the subject vehicle. In a case that there is a slower vehicle, the ACC system decreases the speed and controls a distance from the vehicle in front, so as to ensure driving safety of the subject vehicle.

However, in practice, when the driver is driving, it is frequent that another vehicle overtakes from side to front of the subject vehicle. The conventional FCW system and ACC system can only detect another vehicle in front of the subject vehicle, and cannot timely detect another vehicle which overtakes from side to front of the subject vehicle, thereby may result in a rear-end collision between the subject vehicle and the overtaking vehicle.

SUMMARY

A method and an apparatus for vehicle position detection, which are capable to detect position information of an anterolateral vehicle, are provided according to the embodiments of the disclosure.

A method for vehicle position detection is provided according to an embodiment of the present disclosure. The method includes: acquiring a real image of a region in front of a target vehicle, where the real image is captured by an image collecting device installed on the target vehicle, and the real image is an image captured by the image collecting device at a current moment under a fixed viewing angle; and generating a virtual image based on the real image, and determining position information of a side vehicle of the target vehicle based on the virtual image, where the virtual image is an image captured by the image collecting device at the current moment under a preset viewing angle, and the preset viewing angle is a viewing angle acquired by rotating the fixed viewing angle by a preset angle in a horizontal direction.

In an embodiment, the preset angle is a first angle or a second angle, a first viewing angle is a viewing angle acquired by rotating counterclockwise the fixed viewing angle by the first angle in the horizontal direction, and a second viewing angle is a viewing angle acquired by rotating clockwise the fixed viewing angle by the second angle in the horizontal direction; and the side vehicle of the target vehicle is a left-side vehicle of the target vehicle, in a case that the preset angle is the first angle; and the side vehicle of the target vehicle is a right-side vehicle of the target vehicle, in a case that the preset angle is the second angle.

In an embodiment, the method further includes: establishing a coordinate conversion relationship between a real plane coordinate system and a virtual plane coordinate system. The real plane coordinate system is a two-dimensional coordinate system corresponding to an imaging plane under the fixed viewing angle, and the virtual plane coordinate system is a two-dimensional coordinate system corresponding to an imaging plane under the preset viewing angle. The generating the virtual image based on the real image includes: converting the real image to the virtual image according to the coordinate conversion relationship between the real plane coordinate system and the virtual plane coordinate system.

In an embodiment, the establishing the coordinate conversion relationship between the real plane coordinate system and the virtual plane coordinate system includes: establishing a coordinate conversion relationship between the real plane coordinate system and a real device coordinate system, where the real device coordinate system is a three-dimensional coordinate system established for the image collecting device in a case that the image collecting device is corresponding to the fixed viewing angle; establishing a coordinate conversion relationship between the real device coordinate system and a real world coordinate system, where the real world coordinate system is a world coordinate system established in a case that the image collecting device is corresponding to the fixed viewing angle; establishing to a coordinate conversion relationship between the real world coordinate system and a virtual world coordinate system, where the virtual world coordinate system is a world coordinate system established in a case that the image collecting device is corresponding to the preset viewing angle; establishing a coordinate conversion relationship between the virtual world coordinate system and a virtual device coordinate system, where the virtual device coordinate system is a three-dimensional coordinate system established for the image collecting device in a case that the image collecting device is corresponding to the preset viewing angle; and establishing a coordinate conversion relationship between the virtual device coordinate system and the virtual plane coordinate system.

In an embodiment, the determining the position information of the side vehicle of the target vehicle based on the virtual image includes: detecting a wheel in the virtual image, to acquire a virtual wheel region; converting the virtual wheel region into the real plane coordinate system according to the coordinate conversion relationship between the real plane coordinate system and the virtual plane coordinate system, to acquire a converted real wheel region; and converting the converted real wheel region into the real world coordinate system according to a coordinate conversion relationship between the real plane coordinate system and the real world coordinate system, to acquire position information of the wheel of the side vehicle of the target vehicle.

In an embodiment, the method further includes: learning a wheel feature in a large quantity of vehicle sample images, to acquire a wheel recognition model used for recognizing the wheel. The detecting the wheel in the virtual image includes: detecting the wheel in the virtual image by using the wheel recognition model.

In an embodiment, the method further includes: performing optic flow tracking on the wheel of the side vehicle of the target vehicle, to acquire a real wheel region at the current moment. After acquiring the converted real wheel region, the method further includes: fusing the converted real wheel region and the real wheel region acquired by the optic flow tracking, to acquire a fused real wheel region.

In an embodiment, the acquiring the real wheel region at the current moment includes: performing edge supplement on an optic flow tracking image at the current moment; and acquiring the real wheel region of the wheel of the side vehicle based on the supplemented optic flow tracking image.

In an embodiment, after acquiring the fused real wheel region, the method further includes: acquiring a final real wheel region corresponding to each of one or more sequential history moments before the current moment; and determining whether there is a non-wheel region in the fused real wheel region based on the final real wheel region corresponding to each of the one or more sequential history moments, and removing the non-wheel region in case that there is the non-wheel region in the fused real wheel region.

An apparatus for vehicle position detection is provided according to an embodiment of the present disclosure. The apparatus includes a real image acquiring device, a virtual image generating device and a vehicle position determining device. The real image acquiring device is configured to acquire a real image of a region in front of a target vehicle. The real image is captured by an image collecting device installed on the target vehicle, and the real image is an image captured by the image collecting device at a current moment under a fixed viewing angle. The virtual image generating device is configured to generate a virtual image based on the real image. The virtual image is an image captured by the image collecting device at the current moment under a preset viewing angle, and the preset viewing angle is a viewing angle acquired by rotating the fixed viewing angle by a preset angle in a horizontal direction. The vehicle position determining device is configured to determine position information of a side vehicle of the target vehicle based on the virtual image.

In an embodiment, the preset angle is a first angle or a second angle, a first viewing angle is a viewing angle acquired by rotating counterclockwise the fixed viewing angle by the first angle in the horizontal direction, and a second viewing angle is a viewing angle acquired by rotating clockwise the fixed viewing angle by the second angle in the horizontal direction; and the side vehicle of the target vehicle is a left-side vehicle of the target vehicle, in a case that the preset angle is the first angle; and the side vehicle of the target vehicle is a right-side vehicle of the target vehicle, in a case that the preset angle is the second angle.

In an embodiment, the apparatus further includes a conversion relationship establishing device configured to establish a coordinate conversion relationship between a real plane coordinate system and a virtual plane coordinate system. The real plane coordinate system is a two-dimensional coordinate system corresponding to an imaging plane under the fixed viewing angle, and the virtual plane coordinate system is a two-dimensional coordinate system corresponding to an imaging plane under the preset viewing angle. The virtual image generating device is configured to convert the real image to the virtual image according to the coordinate conversion relationship between the real plane coordinate system and the virtual plane coordinate system.

In an embodiment, the conversion relationship establishing device includes a first establishing sub-device, a second establishing sub-device, a third establishing sub-device, a fourth establishing sub-device and a fifth establishing sub-device. The first establishing sub-device is configured to establish a coordinate conversion relationship between the real plane coordinate system and a real device coordinate system. The real device coordinate system is a three-dimensional coordinate system established for the image collecting device in a case that the image collecting device is corresponding to the fixed viewing angle. The second establishing sub-device is configured to establish a coordinate conversion relationship between the real device coordinate system and a real world coordinate system. The real world coordinate system is a world coordinate system established in a case that the image collecting device is corresponding to the fixed viewing angle. The third establishing sub-device is configured to establish a coordinate conversion relationship between the real world coordinate system and a virtual world coordinate system. The virtual world coordinate system is a world coordinate system established in a case that the image collecting device is corresponding to the preset viewing angle. The fourth establishing sub-device is configured to establish a coordinate conversion relationship between the virtual world coordinate system and a virtual device coordinate system. The virtual device coordinate system is a three-dimensional coordinate system established for the image collecting device in a case that the image collecting device is corresponding to the preset viewing angle. The fifth establishing sub-device is configured to establish a coordinate conversion relationship between the virtual device coordinate system and the virtual plane coordinate system.

In an embodiment, the vehicle position determining device includes a virtual wheel detecting sub-device, a real wheel acquiring sub-device and a vehicle position determining sub-device. The virtual wheel detecting sub-device is configured to detect a wheel in the virtual image, to acquire a virtual wheel region. The real wheel acquiring sub-device is configured to convert the virtual wheel region into the real plane coordinate system according to the coordinate conversion relationship between the real plane coordinate system and the virtual plane coordinate system, to acquire a converted real wheel region. The vehicle position determining sub-device is configured to convert the converted real wheel region into the real world coordinate system according to a coordinate conversion relationship between the real plane coordinate system and the real world coordinate system, to acquire position information of the wheel of the side vehicle of the target vehicle.

In an embodiment, the apparatus further includes a recognition model establishing device configured to learn a wheel feature in a large quantity of vehicle sample images, to acquire a wheel recognition model used for recognizing the wheel. The virtual wheel detecting sub-device is configured to detect the wheel in the virtual image by using the wheel recognition model.

In an embodiment, the apparatus further includes an optic flow tracking device configured to perform optic flow tracking on the wheel of the side vehicle of the target vehicle, to acquire a real wheel region at the current moment. The vehicle position determining device further includes a wheel fusing sub-device configured to fuse, after the converted real wheel region is acquired, the converted real wheel region and the real wheel region acquired by the optic flow tracking, to acquire a fused real wheel region.

In an embodiment, the optic flow tracking device includes an optic flow tracking sub-device, an edge supplementing sub-device and a region acquiring sub-device. The optic flow tracking sub-device is configured to perform the optic flow tracking on the wheel of the side vehicle of the target vehicle. The edge supplementing sub-device is configured to perform edge supplement on an optic flow tracking image at the current moment. The region acquiring sub-device is configured to acquire the real wheel region of the wheel of the side vehicle based on the supplemented optic flow tracking image.

In an embodiment, the vehicle position determining device further includes a history wheel acquiring sub-device and a region removing sub-device. The history wheel acquiring sub-device is configured to acquire, after the fused real wheel region is acquired, a final real wheel region corresponding to each of one or more sequential history moments before the current moment. The region removing sub-device is configured to determine whether there is a non-wheel region in the fused real wheel region based on the final real wheel region corresponding to each of the one or more sequential history moments, and remove the non-wheel region in case that there is the non-wheel region in the fused real wheel region.

An apparatus for vehicle position detection is provided according to an embodiment of the present disclosure. The apparatus includes a processor, a memory and a system bus. The processor and the memory are connected via the system bus. The memory is configured to store one or more programs. The one or more programs includes instructions, the instructions when being performed by the processor cause the processor to perform any one of above embodiments of the method for vehicle position detection.

A computer-readable storage medium storing instructions is provided according to an embodiment of the present disclosure. The instructions when being executed on a terminal device cause the terminal device to perform any one of above embodiments of the method for vehicle position detection.

A computer program product is provided according to an embodiment of the present disclosure. The computer program product when being executed on a terminal device causes the terminal device to perform any one of above embodiments of the method for vehicle position detection.

With the method and the apparatus for vehicle position detection according to the embodiment of the present disclosure, the image collecting device installed on the target vehicle is used to capture the region in front of the target vehicle at the current moment under the fixed viewing angle, to acquire the real image. The virtual image under the preset viewing angle is generated based on the real image, the virtual image includes effective features of the side vehicle, and the side vehicle is accurately recognized based on the effective features, thereby determining the position information of the side vehicle, so as to prevent accidents such as a collision between the target vehicle and the side vehicle.

BRIEF DESCRIPTION OF THE DRAWINGS

For clearer illustration of the technical solutions according to embodiments of the present disclosure, the drawings to be used in embodiments of the present disclosure are briefly described hereinafter.

DETAILED DESCRIPTION OF THE EMBODIMENTS

Figure 1:
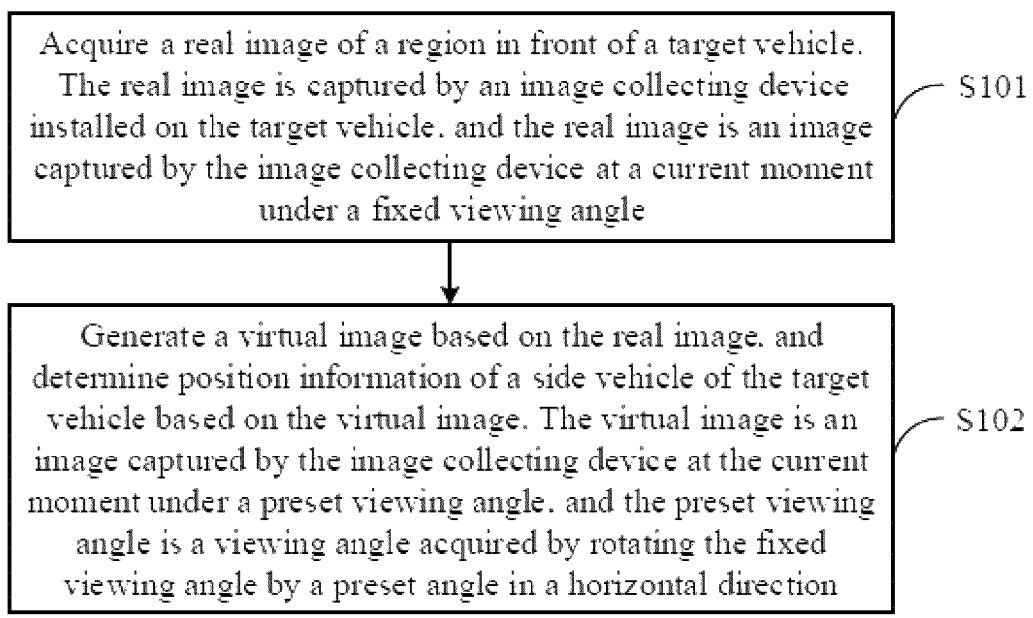
FIG. 1 is a schematic flowchart of a method for vehicle position detection according to an embodiment of the present disclosure.

Reference is made to FIG. 1, which is a schematic flowchart of a method for vehicle position detection according to an embodiment of the present disclosure. The method for vehicle position detection includes steps S101 and S102.

In step S101, a real image of a region in front of a target vehicle is acquired. The real image is captured by an image collecting device installed on the target vehicle, and the real image is an image captured by the image collecting device at a current moment under a fixed viewing angle.

To facilitate description, a vehicle driven by a driver is called the target vehicle in the embodiment.

Figure 2:
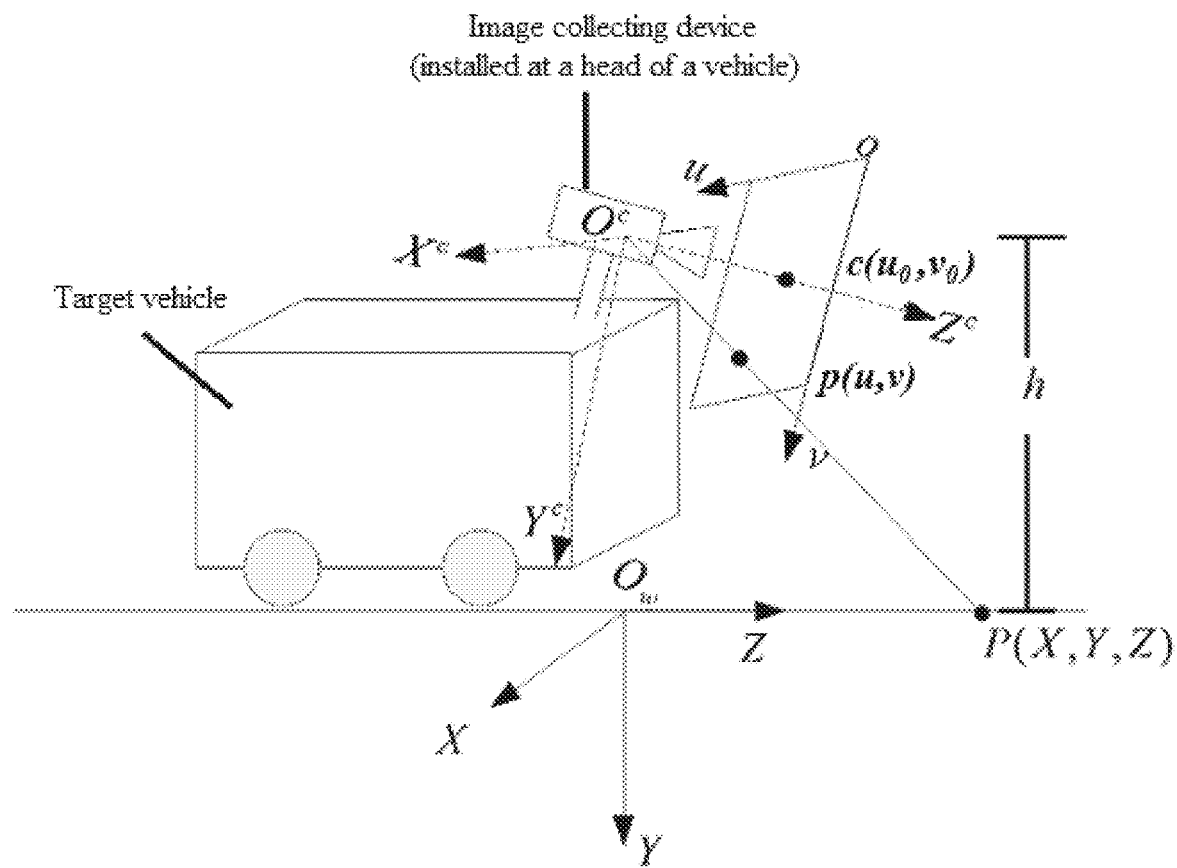
FIG. 2 is a schematic diagram of a position of an image collecting device provided with a fixed viewing angle according to an embodiment of the present disclosure.

In the embodiment, the image collecting device may be installed in advance on the target vehicle. For example, the image collecting device may be a camera, and may be a monocular plane camera. Referring to FIG. 2, the image collecting device may be installed at a head of the target vehicle, or may be installed at top of the target vehicle, so that the image collecting device is capable to capture the region in front of the target vehicle. The region in front of the target vehicle includes a direct front region and an anterolateral region of the target vehicle. The anterolateral region includes a right anterolateral region and a left anterolateral region. During capturing, the region in front of the target vehicle may be captured with a preset time interval (for example, the region is captured every 0.5 second), or captured with a preset forward distance (for example, the region is captured every time the target vehicle drives by 0.3 meter), so that the real image captured at each moment is acquired. The current moment is defined as a moment of current capture in the embodiment.

It should be noted that an installing position of the image collecting device and parameters of the image collecting device may be set in advance, so that a viewing angle of the image collecting device meets a requirement on a capture range. Thereby, the image collecting device when being used captures the region in front of the target vehicle at the fixed viewing angle which has been set, as shown in FIG. 2.

In the embodiment, it may be determined, based on a driving lane of the target vehicle, that position detection is performed on a lane at which side of the target vehicle. Step S102 may be performed to detect position information of a right-side vehicle of the target vehicle, in a case that the driver drives the target vehicle at a left lane, namely, there is no lane at left of the target vehicle and there is a lane at right of the target vehicle. Step S102 may be performed to detect position information of a left-side vehicle of the target vehicle, in a case that the driver drives the target vehicle at a right lane, namely, there is no lane at right of the target vehicle and there is a lane at left of the target vehicle. Step S102 may be performed to detect simultaneously position information of vehicles at both sides of the target vehicle, in a to case that the driver drives the target vehicle at a middle lane, namely, there are a lane at left of the target vehicle and another lane at right of the target vehicle.

In step S102, a virtual image is generated based on the real image, and position information of a side vehicle of the target vehicle is determined based on the virtual image. The virtual image is an image captured by the image collecting device at the current moment under a preset viewing angle, and the preset viewing angle is a viewing angle acquired by rotating the fixed viewing angle by a preset angle in a horizontal direction.

In the embodiment, position information of a left anterolateral vehicle of the target vehicle can be detected as follows.

It should be noted that, the fixed viewing angle is a forward viewing angle, and in a case that there is a left anterolateral vehicle of the target vehicle, although the real image of the front region captured by the image collecting device at the fixed viewing angle includes an object in the left anterolateral region of the target vehicle, the real image may not include an effective feature of the left anterolateral vehicle because of a capturing angle. For example, a symbolic feature such as a wheel may not be captured or may not be clearly captured, thereby the left anterolateral vehicle may not be accurately recognized, and the position information of the left anterolateral vehicle may not be determined.

In view of the above, in the embodiment, the real image captured under the fixed viewing angle is presented under a left-side viewing angle, which is different from the fixed viewing angle. Namely, the fixed viewing angle is rotated leftward by a preset angle, and the left-side viewing angle acquired by rotation is the preset viewing angle. It should be noted that a viewing angle of the image collecting device is not rotated in reality, but is rotated theoretically. Hence, after the virtual image under the left-side viewing angle is generated, the virtual image can include the effective feature of the left anterolateral vehicle because of change of the viewing angle, thereby the left anterolateral vehicle can be accurately recognized based on the effective feature, and the position information of the left anterolateral vehicle can be determined.

In the embodiment, position information of a right anterolaterad vehicle of the target vehicle can be detected as follows.

It should be noted that, the fixed viewing angle is a forward viewing angle, and in a case that there is a right anterolateral vehicle of the target vehicle, although the real image of the front region captured by the image collecting device at the fixed viewing angle includes an object in the right anterolateral region of the target vehicle, the real image may not include an effective feature of the right anterolateral vehicle because of a capturing angle. For example, a symbolic feature such as a wheel may not be captured or may not be clearly captured, thereby the right anterolateral vehicle may not be accurately recognized, and the position information of the right anterolateral vehicle may not be determined.

In view of the above, in the embodiment, the real image captured under the fixed viewing angle is presented under a right-side viewing angle, which is different from the fixed viewing angle. Namely, the fixed viewing angle is rotated rightward by a preset angle, and the right-side viewing angle acquired by rotation is the preset viewing angle. It should be noted that a viewing angle of the image collecting device is not rotated in reality, but is rotated theoretically. Hence, after the virtual image under the right-side viewing angle is generated, the virtual image can include the effective feature of the right anterolateral vehicle because of change of the viewing angle, thereby the right anterolateral vehicle can be accurately recognized based on the effective feature, and the position information of the right anterolateral vehicle can be determined.

In summary, with the method for vehicle position detection according to the embodiment of the present disclosure, the image collecting device installed on the target vehicle is used to capture the region in front of the target vehicle at the current moment under the fixed viewing angle, to acquire the real image. The virtual image under the preset viewing angle is generated based on the real image, the virtual image includes effective features of the side vehicle, and the side vehicle is accurately recognized based on the effective features, thereby determining the position information of the side vehicle, so as to prevent accidents such as a collision between the target vehicle and the side vehicle.

One implementation of step S102 in the first embodiment is introduced in this embodiment. In one embodiment, it is introduced how to detect the position information of the left anterolateral vehicle of the target vehicle.

In the embodiment, the preset angle in the aforementioned step S102 may be a first angle, and a first viewing angle is a viewing angle acquired by rotating counterclockwise the fixed viewing angle by the first angle in the horizontal direction. Based on the above, the side vehicle of the target vehicle is a left-side vehicle of the target vehicle, in a case that the preset angle is the first angle.

In the embodiment, the real image captured under the fixed viewing angle is presented under the left-side viewing angle which is different from the fixed viewing angle. The left-side viewing angle is called the first viewing angle in the embodiment. To facilitate understanding of the first viewing angle, hereinafter an example is taken for illustration that the first viewing angle may be a viewing angle acquired by rotating leftward the fixed viewing angle shown in FIG. 2 by a certain angle, namely, rotating counterclockwise the fixed viewing angle by the certain angle in the horizontal direction. The certain angle of rotation is called the first angle in the embodiment.

Figure 3A:
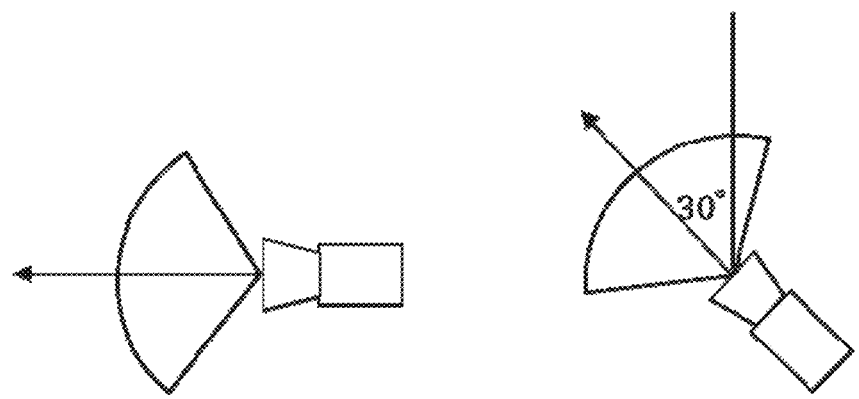
FIG. 3a shows schematic diagrams of different first viewing angles according to an embodiment of the present disclosure.
Figure 3B:
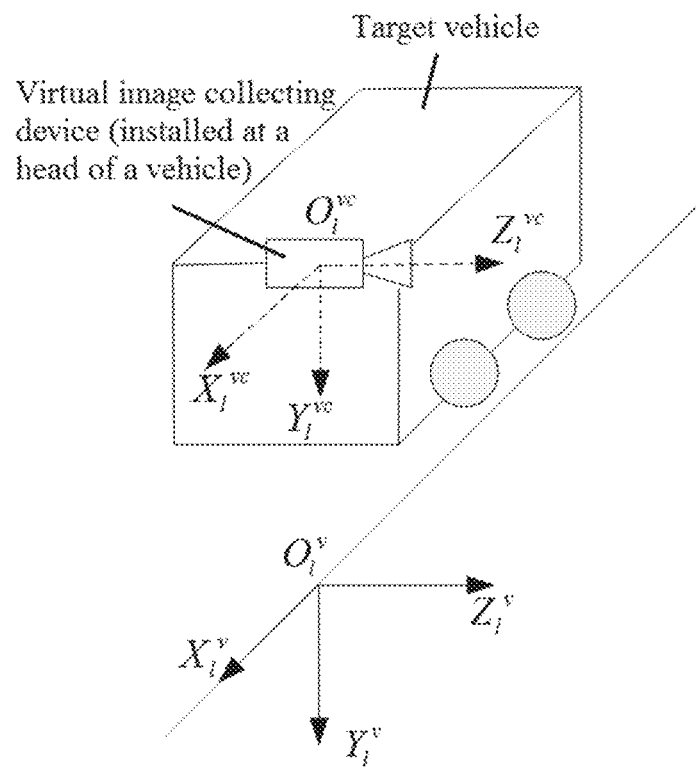
FIG. 3b is a schematic diagram of a position of an image collecting device provided with a first viewing angle according to an embodiment of the present disclosure.

The first angle is not limited in the embodiment. For example, the first angle may be 90 degrees as shown in the left drawing in FIG. 3a. In a case that the first angle is 90 degrees, the image collecting device is installed on the target vehicle as shown in FIG. 3b. In such case, a viewing angle of the image collecting device points to the left, namely, an angle between a direction of the viewing angle and a driving direction of the target vehicle is 90 degrees. For another example, the first angle may be 30 degrees as shown in the right drawing in FIG. 3a. In a case that the first angle is 30 degrees, the angle between the direction of viewing angle of the image collecting device and the driving direction of the target vehicle is 30 degrees.

It should be noted that, in the embodiment, the fixed viewing angle of the image collecting device is not rotated in reality. Hence, an image collecting device corresponding to the fixed viewing angle is a real image collecting device, and an image collecting device corresponding to the first viewing angle is a virtual image collecting device.

In this embodiment, image conversion is performed on the real image captured under the fixed viewing angle, to acquire an image under the first viewing angle. The image under the first viewing angle is called the virtual image in the embodiment. It is appreciated that different first viewing angles correspond to different virtual images. To capture the effective feature of the left anterolateral vehicle, the first viewing angle may be adjusted in real time so that the virtual image includes the effective feature of the left anterolateral vehicle, thereby the left anterolateral vehicle can be accurately recognized based on the effective feature, and the position information of the left anterolateral vehicle can be determined.

To implement step S102, a coordinate conversion relationship between a real plane coordinate system and a virtual plane coordinate system is required to be established in advance. The real plane coordinate system is a two-dimensional coordinate system corresponding to an imaging plane under the fixed viewing angle, and the virtual plane coordinate system is a two-dimensional coordinate system corresponding to an imaging plane under the preset viewing angle. The preset viewing angle may be the first viewing angle.

Hereinafter the real plane coordinate system and the virtual plane coordinate system are illustrated in conjunction with FIG. 2 and FIG. 3b. In one embodiment, the fixed viewing angle of the real image collecting device shown in FIG. 2 corresponds to an imaging plane, a two-dimensional coordinate system uov is established for the imaging plane, and the two-dimensional coordinate system uov is the real plane coordinate system. In a same way, the first viewing angle of the virtual image collecting device shown in FIG. 3b corresponds to an imaging plane, a two-dimensional coordinate system $u_1 o_1 v_1$ is established for the imaging plane, and the two-dimensional coordinate system $u_1 o_1 v_1$ is the virtual plane coordinate system.

To facilitate distinction, the image collecting device corresponding to the fixed viewing angle is called the real image collecting device, and the image collecting device corresponding to the first viewing angle is called the virtual image collecting device. For convenience, hereinafter in the embodiment, the left anterolateral vehicle of the target vehicle is abbreviated as the left-side vehicle.

In an implementation of the embodiment, a process of establishing the coordinate conversion relationship between the real plane coordinate system and the virtual plane coordinate system includes steps A1 to E1, where a sequence of steps A1 to E1 is not limited.

In step A1, a coordinate conversion relationship between the real plane coordinate system and a real device coordinate system is established. The real device coordinate system is a three-dimensional coordinate system established for the image collecting device in a case that the image collecting device is corresponding to the fixed viewing angle.

As mentioned above, the two-dimensional coordinate system uov shown in FIG. 2 is the real plane coordinate system.

In the embodiment, a three-dimensional coordinate system $O^c X^c Y^c Z^c$ is set for the real image collecting device, and the three-dimensional coordinate system $O^c X^c Y^c Z^c$ is defined as the real device coordinate system. In the embodiment, a position of an origin and directions of axes of the real device coordinate system $O^c X^c Y^c Z^c$ are not limited, as long as a position of the real device coordinate system $O^c X^c Y^c Z^c$ relative to the real image collecting device does not change during driving of the target vehicle. For example, as shown in FIG. 2, the real device coordinate system $O^c X^c Y^c Z^c$ is established by setting an optic center of the real image collecting device as the origin $O^c$, axis $Z^c$ coincides with an optic axis of the real image collecting device, and axis $X^c$ and axis $Y^c$ are parallel to axis ou and axis ov of the imaging plane, respectively.

The coordinate in the real device coordinate system $O^c X^c Y^c Z^c$ of an arbitrary point P in real 3D space is $p(x_c, y_x, z_z)$. In a case tat the point P can be captured by the real image collecting device, there is a unique point p(u, v) corresponding to the point P in the real plane coordinate system uov. The corresponding relationship may be described as:

$$(u,v)=F(x_c, y_c, z_c) \quad (1)$$

F is a projection model of the real image collecting device, the projection model is determined by an interior parameter of the real image collecting device, and the interior parameter of the real image collecting device may be acquired by an off-line calibration algorithm.

The equation (1) describes the coordinate conversion relationship between the real plane coordinate system uov and the real device coordinate system $O^c X^c Y^c Z^c$. In equation (1), the projection model F corresponding to the real image collecting device is:

$$u = f_x \frac{x_c}{z_c} + u_0$$
$$v = f_y \frac{y_c}{z_c} + v_0$$

where, $$f_x = \frac{f}{dx}, f_y = \frac{f}{dy},$$

f is a focal length of the real image collecting device, dx and dy are physical dimensions of a width and a height, respectively, of a single pixel of the real image collecting device, $u_0$ and $v_0$ are interior parameters of the real image collecting device, and $(u_0, v_0)$ is the pixel coordinate of an intersection point between the optic axis of the real image collecting device and the imaging plane.

In step B1, a coordinate conversion relationship between the real device coordinate system and a real world coordinate system is established. The real world coordinate system is a world coordinate system established in a case that the image collecting device is corresponding to the fixed viewing angle.

In the embodiment, a world coordinate system $O_w XYZ$ is established for the real image collecting device, and the world coordinate system $O_w XYZ$ is defined as the real world coordinate system. In the embodiment, a position of an origin and directions of axes of the real world coordinate system $O_w XYZ$ are not limited, as long as a position of the real world coordinate system $O_w XYZ$ relative to the target vehicle does not change during driving of the target vehicle. For example, as shown in FIG. 2, a certain point A of the real image collecting device may be acquired. Assuming that the real image collecting device is a camera, an optic center of the camera may be acquired as the point A. An intersection point between a perpendicular line crossing the point A (namely, a straight line crossing the point A and perpendicular to the ground plane) and the ground plane serves as the origin $O_w$ of the real world coordinate system $O_w XYZ$. As for axis X, axis Y and axis Z of the real world coordinate system $O_w XYZ$, the axis Z may point to the front of the head of the target vehicle, the axis X may point to the right of the target vehicle, and the axis Y is perpendicular to the axis X and the axis Z and points to the ground. For another example, the position of the origin $O_w$, the direction of the axis X, the direction of the axis Y, and the direction of the axis Z are four coordinate elements as shown in FIG. 2, and one or more of the coordinate elements may be changed. As an example, a certain point on the target vehicle may serve as the aforementioned point A, the directions of the axis X, the axis Y and the axis Z shown in FIG. 2 may be changed, In one embodiment, may be reversed, and a changed coordinate system serves as the real world coordinate system $O_w XYZ$.

In the embodiment, a height h of the origin $O^c$ of the real device coordinate system $O^c X^c Y^c Z^c$ from the ground plane may be measured in advance, and the real device coordinate system $O^c X^c Y^c Z^c$ may be treated as being acquired by rotating the real world coordinate system $O_w XYZ$ sequentially by $\alpha$ degrees along the axis X, by $\beta$ degrees along the axis Y, and by $\gamma$ degrees along the axis Z. After the image collecting device is installed on the target vehicle, $\alpha$, $\beta$ and $\gamma$ have fixed values and can be determined by an exterior parameter calibration algorithm.

For the arbitrary point P in real 3D space, a conversion relationship between the coordinate $p(x_c, y_c, z_c)$ in the real device coordinate system $O^c X^c Y^c Z^c$ and the coordinate $p(x_w, y_w, z_w)$ in the real world coordinate system $O_w XYZ$ are as follows:

$$\begin{pmatrix} x_c \\ y_c \\ z_c \end{pmatrix} = R \begin{pmatrix} x_w \\ y_w \\ z_w \end{pmatrix} \quad (2)$$

where R is a rotation matrix, and the matrix R can be determined by the aforementioned $\alpha$, $\beta$, and $\gamma$.

The equation (2) describes the coordinate conversion relationship between the real device coordinate system $O^c X^c Y^c Z^c$ and the real world coordinate system $O_w XYZ$.

In step C1, a coordinate conversion relationship between the real world coordinate system and a virtual world coordinate system is established. The virtual world coordinate system is a world coordinate system established in a case that the image collecting device is corresponding to the preset viewing angle.

In the embodiment, a world coordinate system $O_i^v X_i^v Y_i^v Z_i^v$ is established for the virtual image collecting device, and the world coordinate system $O_i^v X_i^v Y_i^v Z_i^v$ is defined as the virtual world coordinate system. In the embodiment, a position of an origin and directions of axes of the virtual world coordinate system $O_i^v X_i^v Y_i^v Z_i^v$ are not limited, as long as a position of the virtual world coordinate system $O_i^v X_i^v Y_i^v Z_i^v$ relative to the target vehicle does not change during driving of the target vehicle. For example, as shown in FIG. 3b, a certain point A of the virtual image collecting device may be acquired. Assuming that the virtual image collecting device is a camera, an optic center of the camera may be acquired as the point A. An intersection point between a perpendicular line crossing the point A (namely, a straight line crossing the point A and perpendicular to the ground plane) and the ground plane serves as the origin $O_i^v$ of the virtual world coordinate system $O_i^v X_i^v Y_i^v Z_i^v$. As for axis $X_i^v$, axis $Y_i^v$ and axis $Z_i^v$ of the virtual world coordinate system $O_i^v X_i^v Y_i^v Z_i^v$, the axis $X_i^v$ may point to the front of the head of the target vehicle, the axis $Z_i^v$ may point to the left of the target vehicle, and the axis $Y_i^v$ is perpendicular to the axis $X_i^v$ and the axis $Z_i^v$ and points to the ground. For another example, the position of the origin $O_i^v$, the direction of the axis $X_i^v$, the direction of the axis $Y_i^v$, and the direction of the axis $Z_i^v$ are four coordinate elements as shown in FIG. 3b, and one or more of the coordinate elements may be changed. As an example, a certain point on the target vehicle may serve as the aforementioned A, the directions of the axis $X_i^v$, the axis $Y_i^v$ and the axis $Z_i^v$ shown in FIG. 3b may be changed. In one embodiment, may be reversed, and a changed coordinate system serves as the virtual world coordinate system $O_i^v X_i^v Y_i^v Z_i^v$.

It should be noted that, with respect to the real image collecting device, the virtual image collecting device should be moved by S (S>0) meters towards the head of the vehicle, so that the virtual image is capable to cover a left region of the real image as much as possible.

The real world coordinate system $O_w XYZ$ shown in FIG. 2 and the virtual world coordinate system $O_i^v X_i^v Y_i^v Z_i^v$ shown in FIG. 3b are taken as an example. For the arbitrary point P in real 3D space, the coordinate in the real world coordinate system $O_w XYZ$ is $p(x_w, y_w, z_w)$, and the point P is a space point is a left region of the target vehicle in a case that $x_w<0$. A coordinate conversion equation to convert $p(x_w, y_w, z_w)$ into the coordinate $p(x_i^v, y_i^v, z_i^v)$ in the virtual world coordinate system $O_i^v X_i^v Y_i^v Z_i^v$ is:

$$x_i^v = z_w - s$$

$$y_i^v = y_w$$

$$z_i^v = -x_w \quad (3)$$

The equation (3) describes the coordinate conversion relationship between the real world coordinate system $O_w XYZ$ and the virtual world coordinate system $O_i^v X_i^v Y_i^v Z_i^v$.

In step D1, a coordinate conversion relationship between the virtual world coordinate system and a virtual device coordinate system is established. The virtual device coordinate system is a three-dimensional coordinate system established for the image collecting device in a case that the image collecting device is corresponding to the preset viewing angle.

In the embodiment, a three-dimensional coordinate system $O_i^{vc}X_i^{vc}Y_i^{vc}Z_i^{vc}$ is set for the virtual image collecting device, and the three-dimensional coordinate system $O_i^{vc}X_i^{vc}Y_i^{vc}Z_i^{vc}$ is defined as the virtual device coordinate system. In the embodiment, a position of an origin and directions of axes of the virtual device coordinate system $O_i^{vc}X_i^{vc}Y_i^{vc}Z_i^{vc}$ are not limited, as long as a position of the virtual device coordinate system $O_i^{vc}X_i^{vc}Y_i^{vc}Z_i^{vc}$ relative to the virtual image collecting device does not change during driving of the target vehicle. For example, as shown in FIG. 3b, the virtual device coordinate system $O_i^{vc}X_i^{vc}Y_i^{vc}Z_i^{vc}$ is established by setting an optic center of the virtual image collecting device as the origin $O_i^{vc}$, axis $Z_i^{vc}$ coincides with an optic axis of the virtual image collecting device, axis $X_i^{vc}$ points to the head of the target vehicle, and axis $Y_i^{vc}$ points to the ground.

For the arbitrary point P in real 3D space, a conversion relationship between the coordinate $p(x_i^{vc}, y_i^{vc}, z_i^{vc})$ in the virtual device coordinate system $O_i^{vc}X_i^{vc}Y_i^{vc}Z_i^{vc}$ and the coordinate $p(x_i^v, y_i^v, z_i^v)$ in the virtual world coordinate system $O_i^v X_i^v Y_i^v Z_i^v$ is as follows:

$$\begin{pmatrix} x_i^{vc} \\ y_i^{vc} \\ z_i^{vc} \end{pmatrix} = R \begin{pmatrix} x_i^v \\ y_i^v \\ z_i^v \end{pmatrix} \quad (4)$$

R is a rotation matrix.

The equation (4) describes the coordinate conversion relationship between the virtual world coordinate system $O_i^v X_i^v Y_i^v Z_i^v$ and the virtual device coordinate system $O_i^{vc}X_i^{vc}Y_i^{vc}Z_i^{vc}$.

In step E1, a coordinate conversion relationship between the virtual device coordinate system and the virtual plane coordinate system is established.

As shown in FIG. 3b, the coordinate in the virtual device coordinate system $O_i^{vc}X_i^{vc}Y_i^{vc}Z_i^{vc}$ of the arbitrary point P in real 3D space are $p(x_i^{vc}, y_i^{vc}, z_i^{vc})$. In a case the point P is in the virtual image, there is a unique point $p(u1, v1)$ corresponding to the point P in the virtual plane coordinate system $u_1 o_1 v_1$, and a corresponding relationship can be described as:

$$(u1, v1) = F(x_i^{vc}, y_i^{vc}, z_i^{vc}) \quad (5)$$

F is a projection model of the virtual image collecting device. Because the virtual image collecting device is the image collecting device acquired by changing the viewing angle of the real image collecting device, the projection model is determined by the interior parameter of the real image collecting device, and the interior parameter of the real image collecting device may be acquired by the off-line calibration algorithm.

The equation (5) describes the coordinate conversion relationship between the virtual device coordinate system $O_i^{vc}X_i^{vc}Y_i^{vc}Z_i^{vc}$ and the virtual plane coordinate system $u_1 o_1 v_1$. In equation (5), the projection model F is:

$$u1 = f_{x1} \frac{x_i^{vc}}{z_i^{vc}} + u_{01}$$

$$v1 = f_{y1} \frac{x_i^{vc}}{z_i^{vc}} + v_{01}$$

where $f_{x1} = \frac{f}{dx_{c1}}, f_{y1} = \frac{f}{dy_{c1}}$, f is a focal length of the virtual image collecting device, $dx_{c1}$ and $dy_{c1}$ are physical dimensions of a width and a height, respectively, of a single pixel of the virtual image collecting device, $u_{01}$ and $v_{01}$ are interior parameters of the virtual image collecting device, and $(u_{01}, v_{01})$ is the pixel coordinate of an intersection point between the optic axis of the virtual image collecting device and the imaging plane.

In the embodiment, a height h of the origin $O_i^{vc}$ of the virtual device coordinate system $O_i^{vc}X_i^{vc}Y_i^{vc}Z_i^{vc}$ from the ground plane may be measured in advance, and the virtual device coordinate system $O_i^{vc}X_i^{vc}Y_i^{vc}Z_i^{vc}$ may be treated as being acquired by rotating the virtual world coordinate system $O_i^v X_i^v Y_i^v Z_i^v$ sequentially by α degrees along the axis $X_i^v$, by β degrees along the axis $Y_i^v$, and by γ degrees along the axis $Z_i^v$. After the position of the virtual image collecting device relative to the target vehicle is fixed, α, β and γ have fixed values and can be determined by an exterior parameter calibration algorithm. Such parameters can be used to determine the matrix R in the equation (4).

It should be noted that, when converting is performed between a 2D image and a 3D image via the virtual image collecting device, it is required that an image within a close range of the target vehicle is clear in the embodiment, so as to ensure an imaging effect of the virtual image. Hence, a small focal length is required to be set. For example, the focal length f of the virtual image collecting device is set to be 1. To further ensure image definition, the physical dimensions of the width and the height of the single pixel is required to be large. For example, $dx_{c1}$ and $dy_{c1}$ are 100. Moreover, a small 3D depth may be set. For example, the 3D depth Z is set to be 1.

Therefore, the coordinate conversion relationship between the real plane coordinate system and the virtual plane coordinate system are established by establishing a series of the aforementioned coordinate conversion relationships.

Based on the above, in an implementation of the embodiment, the operation of generating the virtual image based on the real image in step S102 of the first embodiment may include: converting the real image to the virtual image according to the coordinate conversion relationship between the real plane coordinate system and the virtual plane coordinate system. In the implementation, coordinates of each pixel of the real image in the real plane coordinate system can be determined, and then the coordinate of the each pixel in the virtual plane coordinate system is calculated according to the aforementioned equations (1) to (5), so that coordinate position of pixels in the real image are converted to generate the virtual image.

It can be appreciated that, a shape of a wheel of the left-side vehicle in the real image varies as a relative position between the left-side vehicle and the target vehicle varies. Particularly, the real image of the wheel of the left-side vehicle includes few features when the left-side vehicle and the target vehicle are too close. However, the virtual image of the wheel has more features, and the wheels corresponding to different relative positions have similar shapes when using different first viewing angles. Namely, the embodiment is not limited by the relative position between the target vehicle and the left-side vehicle, and the similar shapes of the wheels of the left-side vehicle can be detected as long as a proper first viewing angle is used, thereby facilitating determination of a position of the left-side vehicle.

Figure 5A:
FIG. 5a to FIG. 5d are schematic diagrams of a real image and a virtual image according to an embodiment of the present disclosure.
Figure 5B:
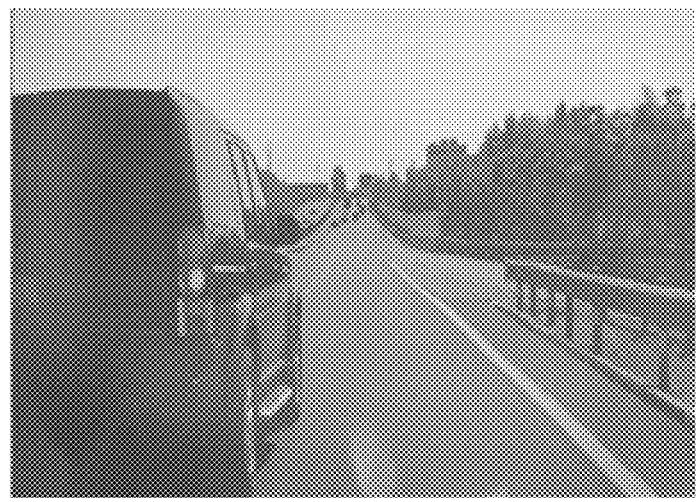
Figure 5C:
Figure 5D:

For perceptual understanding, hereinafter an effect of converting the real image to the virtual image is illustrated by an example. As shown in FIG. 5a to FIG. 5d, FIG. 5a and FIG. 5b are both the real images, where the two real images display a same left-side vehicle at different positions relative to the target vehicle. FIG. 5c is the virtual image corresponding to the real image shown in FIG. 5a, and is the virtual image under the first viewing angle shown in the left drawing (namely, FIG. 3b) in FIG. 3a. FIG. 5d is the virtual image corresponding to the real image shown in FIG. 5b, and is the virtual image under the first viewing angle shown the right drawing in FIG. 3a. It can be understood that the wheel shown in FIG. 5b may not be displayed in the virtual image, when the virtual image is generated from the wheel shown in FIG. 5b by using the first viewing angle shown in the left drawing in FIG. 3a.

Figure 6:
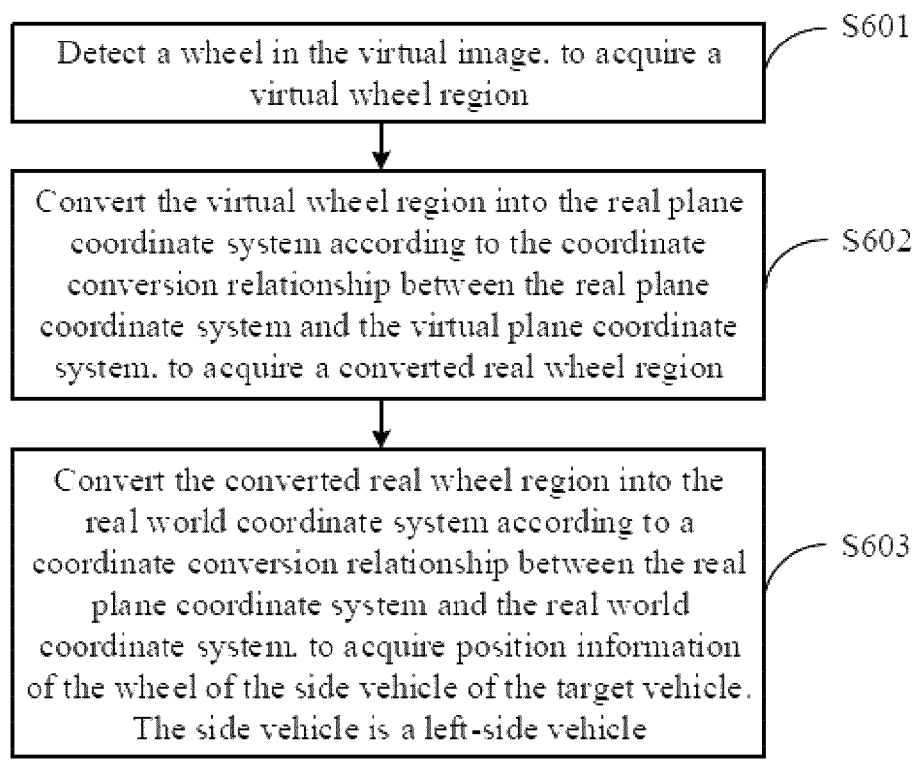
FIG. 6 is a schematic flowchart of a method for determining position information of a left-side vehicle according to an embodiment of the present disclosure.

Based on the above, in an implementation of the embodiment, the operation of determining position information of a side vehicle of the target vehicle based on the virtual image in step S102 of the first embodiment may include: determining the position information of the left-side vehicle via a detecting result of the wheel of the left-side vehicle, and may include steps S601 to S603 as shown in FIG. 6.

In step S601, a wheel in the virtual image is detected to acquire a virtual wheel region.

The wheel in the virtual region serves as a region of interest (ROI) to be detected. In the embodiment, the detected ROI of the wheel is called the virtual wheel region.

In one implementation, step S601 may include: detecting the wheel in the virtual image by using a wheel recognition model. In the implementation, it is required to collect in advance a large quantity of vehicle sample images including the wheel, and learn a wheel feature in the large quantity of vehicle sample images to acquire the wheel recognition model used for recognizing the wheel. In such case, after the virtual image is generated, the wheel recognition model can be used to detect the wheel in the virtual image.

Figure 7:
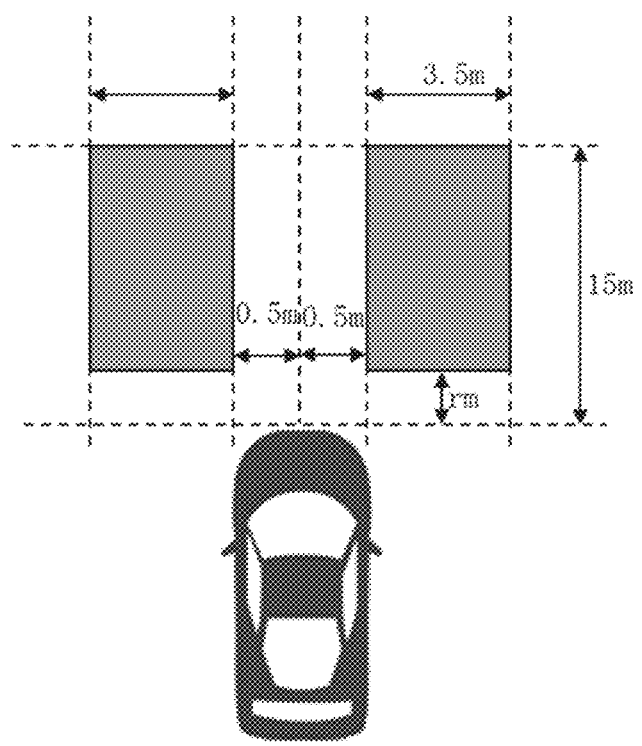
FIG. 7 is a schematic diagram of a wheel detecting region according to an embodiment of the present disclosure.

In one implementation, a sliding window may be used in a detection region of the virtual image, to collect a wheel sample and perform detection. For example, the detecting region is as shown in FIG. 7 and is divided into a left front region and a right front region, each of which has an area of 3.5 m×(15-r)m, r is the smallest distance from the real image collecting device a point at which can be acquired by the real image collecting device, and is relevant to an installation position and an exterior parameter of the real image collecting device. In the embodiment, a left anterolateral region is required to be detected, and a step size may be set as 0.3 m or other lengths in both lateral and longitudinal directions. The wheel sample collected by the sliding window is acquired, and the detecting result of the wheel in each frame of collected images is acquired by using the wheel recognition model.

Figure 8A:
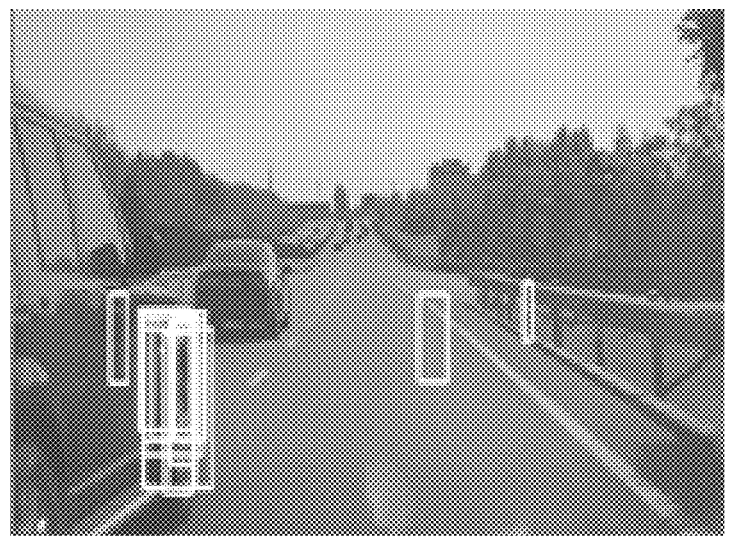
FIG. 8a to FIG. 8f are schematic diagrams of a wheel detecting result according to an embodiment of the present disclosure.
Figure 8B:
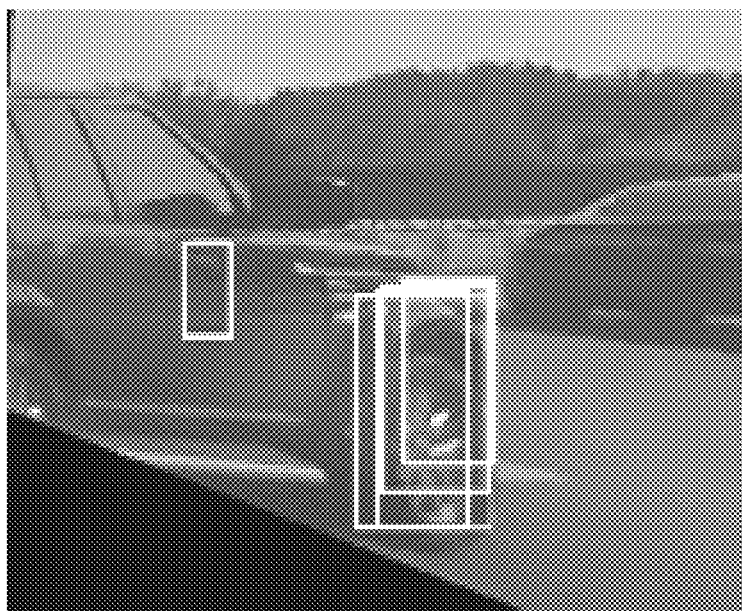
Figure 8C:
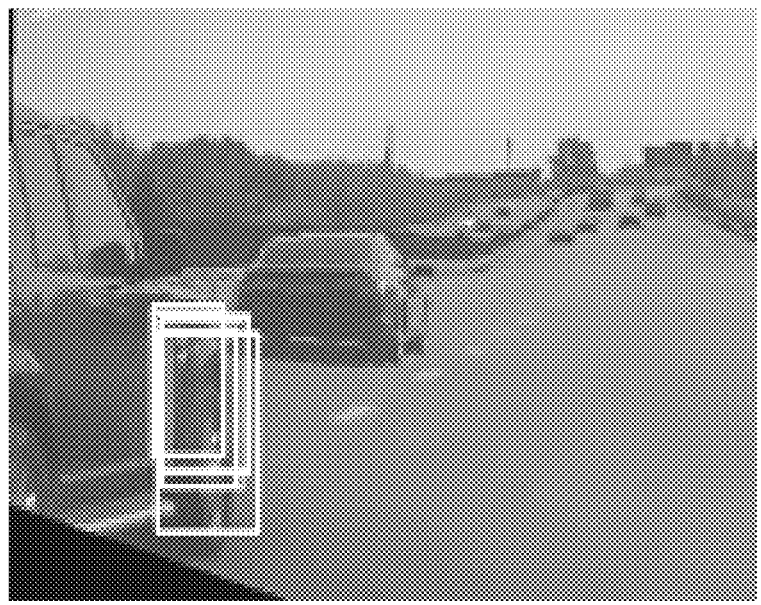
Figure 8D:
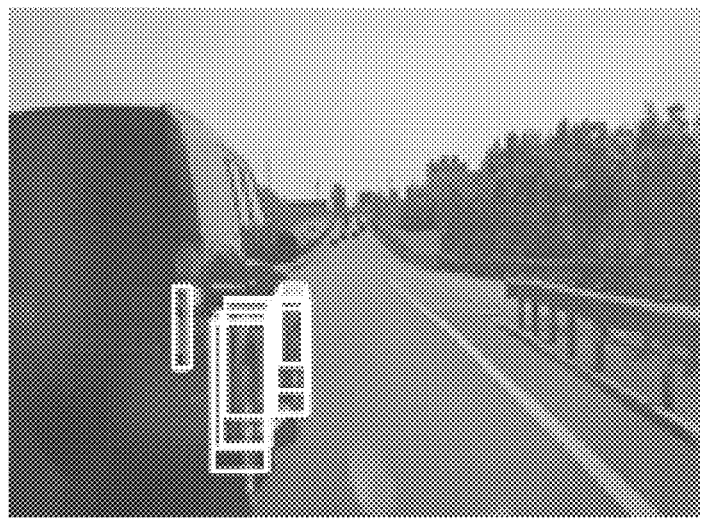
Figure 8E:
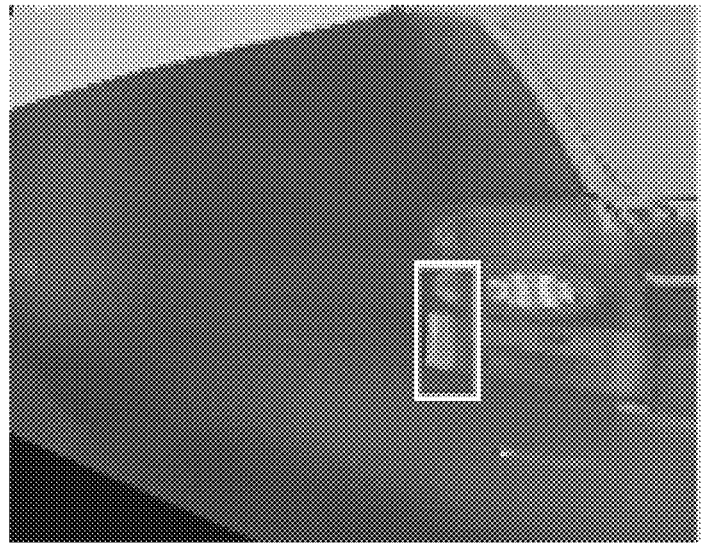
Figure 8F:
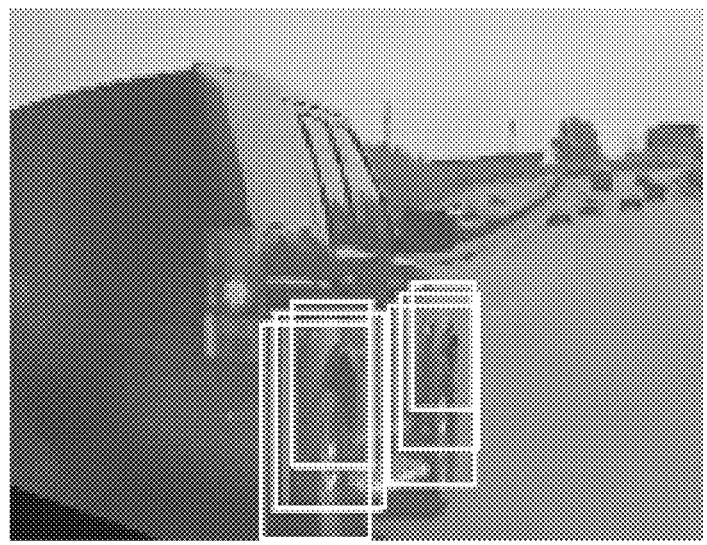

Hereinafter the detecting effect of the wheel in the virtual image is illustrated by an example. As shown in FIG. 8a to FIG. 8f, FIG. 8a and FIG. 8d are both the real images, where the two real images display a same left-side vehicle at different positions relative to the target vehicle. FIG. 8b is the virtual image corresponding to the real image shown in FIG. 8a, and is the virtual image under the first viewing angle shown in the left drawing (namely, FIG. 3b) in FIG. 3a. FIG. 8c is also the virtual image corresponding to the real image shown in FIG. 8a, and is the virtual image under the first viewing angle shown in the right drawing in FIG. 3a. FIG. 8e is the virtual image corresponding to the real image shown in FIG. 8d, and is the virtual image under the first viewing angle shown in the left drawing (namely, FIG. 3b) in FIG. 3a, FIG. 8f is also the virtual image corresponding to the real image shown in FIG. 8d, and is the virtual image under the first viewing angle shown in the right drawing in FIG. 3a. In each virtual image, regions selected by one or more boxes are the wheel regions detected by the wheel recognition model. However, the position of the left-side vehicle results in that the FIG. 8e may not display the wheel, it is selected to detect the wheel region from FIG. 8f.

In step S602, the virtual wheel region is converted into the real plane coordinate system according to the coordinate conversion relationship between the real plane coordinate system and the virtual plane coordinate system, to acquire a converted real wheel region.

In the implementation, the coordinate of each pixel of the virtual wheel region in the virtual plane coordinate system can be determined, and then the coordinate of the each pixel in the real plane coordinate system is calculated according to the aforementioned equations (1) to (5), so that coordinate position of pixels in the virtual image are converted, thereby acquiring the converted real wheel region.

In step S603, the converted real wheel region is converted into the real world coordinate system according to a coordinate conversion relationship between the real plane coordinate system and the real world coordinate system, to acquire position information of the wheel of the side vehicle of the target vehicle, where the side vehicle is the left-side vehicle.

In the implementation, the coordinate of each pixel of the converted real wheel region in the real plane coordinate system can be determined, and then the coordinate of the each pixel in the real word coordinate system are calculated according to the aforementioned equations (1) to (5), namely, the coordinate of the wheel of the left-side vehicle in the real word coordinate system is determined. When the coordinate of the wheel of the left-side vehicle in the real word coordinate system is determined, the position of the left-side vehicle relative to the target vehicle can be determined according to a position relationship between the left-side vehicle and the wheel of the left-side vehicle.

In practice, in a case that the embodiment is applied to an FCW system of the target vehicle, a driver may be warned with light, sound, vibration and the like, when it is determined that the left-side vehicle and the target vehicle are close to each other. In a case that the embodiment is applied to an ACC system of the target vehicle, a distance between the target vehicle and the left-side vehicle may be controlled when it is determined that the left-side vehicle and the target vehicle are close to each other, so as to ensure driving safety of the target vehicle.

Further, in the aforementioned step S601, there may be some misrecognition in the detecting result in a case that the wheel recognition model is used to detect the wheel in the virtual image, which results in a non-wheel region in region images acquired in step S602. Hence, optic flow tracking is further performed in real time on the wheel of the side vehicle of the target vehicle, to acquire a real wheel region at the current moment. That is, a real wheel region acquired by the optic-flow-tracking is obtained, so as to use the real wheel region acquired by the optic-flow-tracking to remove the non-wheel region acquired in step S602.

The acquiring the real wheel region at the current moment, i.e., the real wheel region acquired by the optic-flow-tracking may include: performing edge supplement on an optic flow tracking image at the current moment; and acquiring the real wheel region of the wheel of the side vehicle based on the supplemented optic flow tracking image. In one embodiment, a method of optic flow tracking does not have an ideal effect of tracing a target object located at a boundary of a tracking image. In the embodiment, the target object is the wheel of the left-side vehicle, and the wheel of the left-side vehicle appears, in most cases, at the left of the tracking image. Therefore, the edge supplement is performed on the tracking image in the embodiment. For example, a white region is added to an edge of the image, then the wheel is tracked in the supplemented image by using a pyramid LK (Lucas Kanade) optic flow method, and accuracy of a tracking result is improved.

Figure 9:
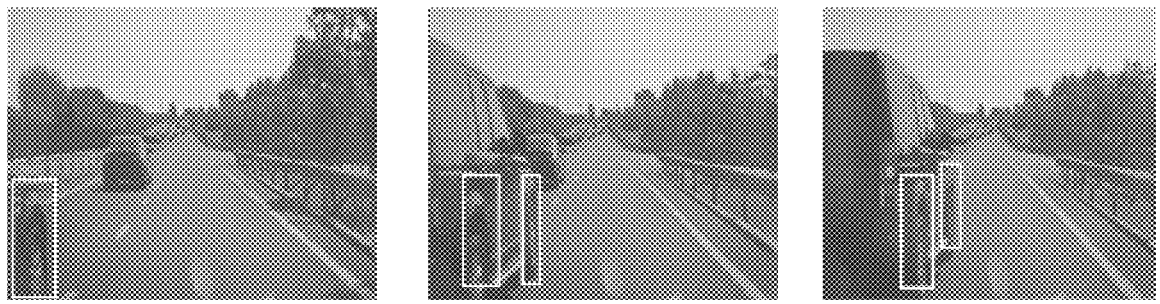
FIG. 9 shows schematic diagrams of a fusing result of machine learning and optic flow tracking according to an embodiment of the present disclosure.

Based on the above, in an implementation of the embodiment, the method after step S602 may further includes: fusing the converted real wheel region and the real wheel region acquired by the optic flow tracking, to acquire a fused real wheel region. In the implementation, after the optic flow tracking result is acquired, the optic flow tracking result is fused with an image conversion result in step S602. In this way, the non-wheel region in the image conversion result can be removed. For example, as shown in FIG. 9, box regions are fusing results, and then step S603 is performed by using the fused real wheel region.

Further, there may still be a non-wheel region in the fused real wheel region. To ensure accuracy of the wheel detecting result, in an implementation of the embodiment, after acquiring the fused real wheel region, the method further includes: acquiring a final real wheel region corresponding to each of one or more sequential history moments before the current moment; and determining whether there is a non-wheel region in the fused real wheel region based on the final real wheel region corresponding to each of the one or more sequential history moments, and removing the non-wheel region in case that there is the non-wheel region in the fused real wheel region. In the implementation, a most recent detection moment or multiple sequential most recent moments before the current moment are acquired to use a manner of forward linkage. Such detection moments are all the history moments, for each of the history moments when serving as the current moment, the wheel of the left-side vehicle is detected based on the real image, thereby acquiring the final real wheel region. Because the current moment and the history moments form sequential moments, variation of the wheel at such series of the sequential moments can be determined based on the detected wheel region. Because variation of the position of the wheel should be continuous, it can be determined whether there is the non-wheel region in the fused real wheel region corresponding to the current moment, thereby removing the non-wheel region. Afterwards, step S603 is performed by using the real wheel region acquired after a removing operation.

In summary, according to the embodiment, the real image can be converted to the virtual image via the coordinate conversion relationship, the wheel in the virtual image can be detected, and the position information of the left-side vehicle of the target vehicle is determined via the wheel detecting result. In one embodiment, the wheel region may be detected by a combination of manners such as machine learning, optic flow tracking, and linkage of images at multiple moments. The accuracy of the wheel detecting result is improved, and thereby accuracy of position detecting result of the left-side vehicle is improved.

One implementation of step S102 in the first embodiment is introduced in this embodiment. In one embodiment, it is introduced how to detect the position information of the right anterolateral vehicle of the target vehicle.

In the embodiment, the preset angle in the aforementioned step S102 may be a second angle, and a second viewing angle is a viewing angle acquired by rotating clockwise the fixed viewing angle by the second angle in the horizontal direction. Based on the above, the side vehicle of the target vehicle is a right-side vehicle of the target vehicle, in a case that the preset angle is the second angle.

In the embodiment, the real image captured under the fixed viewing angle is presented under the right-side viewing angle which is different from the fixed viewing angle. The right-side viewing angle is called the second viewing angle in the embodiment. To facilitate understanding of the second viewing angle, hereinafter an example is taken for illustration that the second viewing angle may be a viewing angle acquired by rotating rightward the fixed viewing angle shown in FIG. 2 by a certain angle, namely, rotating clockwise the fixed viewing angle by the certain angle in the horizontal direction. The certain angle of rotation is called the second angle in the embodiment.

Figure 4A:
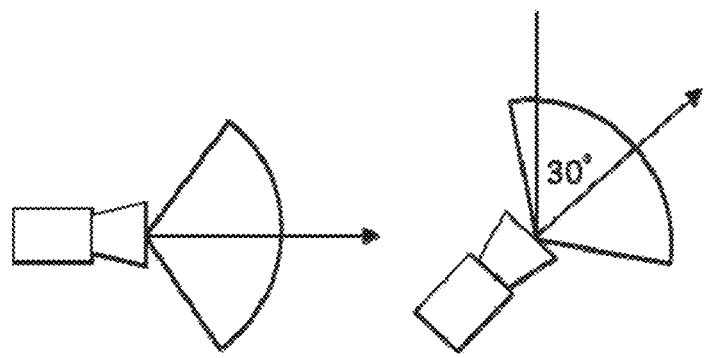
FIG. 4a shows schematic diagrams of different second viewing angles according to an embodiment of the present disclosure.
Figure 4B:
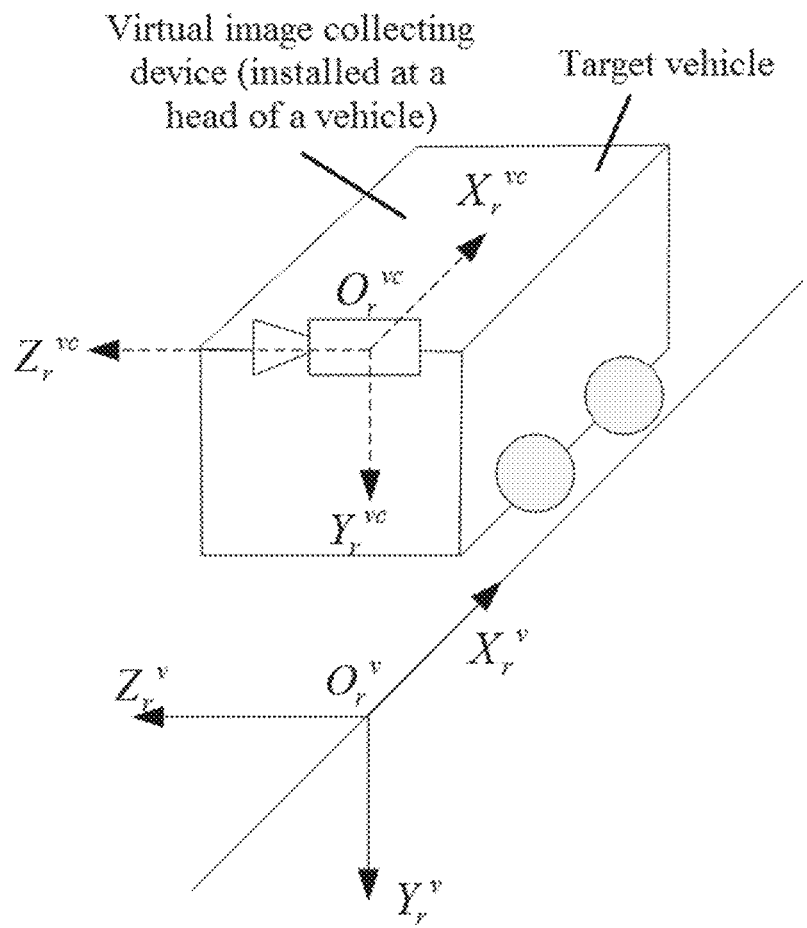
FIG. 4b is a schematic diagram of a position of an image collecting device provided with a second viewing angle according to an embodiment of the present disclosure.

The second angle is not limited in the embodiment. For example, the second angle may be 90 degrees as shown in the left drawing in FIG. 4a. In a case that the second angle is 90 degrees, the image collecting device is installed on the target vehicle as shown in FIG. 4b. In such case, a viewing angle of the image collecting device points to the right, namely, an angle between a direction of the viewing angle and a driving direction of the target vehicle is 90 degrees. For another example, the second angle may be 30 degrees as shown in the right drawing in FIG. 4a. In a case that the second angle is 30 degrees, the angle between the direction of viewing angle of the image collecting device and the driving direction of the target vehicle is 30 degrees.

It should be noted that, in the embodiment, the fixed viewing angle of the image collecting device is not rotated in reality. Hence, an image collecting device corresponding to the fixed viewing angle is a real image collecting device, and an image collecting device corresponding to the second viewing angle is a virtual image collecting device.

Additionally, directions of the first viewing angle in the second embodiment, the second viewing angle in the third embodiment, and the fixed viewing angle, may be parallel to the ground or form a certain angle with respect to the ground, which can be set according to experience in practice.

In this embodiment, image conversion is performed on the real image captured under the fixed viewing angle, to acquire an image under the second viewing angle. The image under the second viewing angle is called the virtual image in the embodiment. It is appreciated that different second viewing angles correspond to different virtual images. To capture the effective feature of the right anterolateral vehicle, the second viewing angle may be adjusted in real time so that the virtual image includes the effective feature of the right anterolateral vehicle, thereby the right anterolateral vehicle can be accurately recognized based on the effective feature, and the position information of the right anterolateral vehicle can be determined.

To implement step S102, a coordinate conversion relationship between a real plane coordinate system and a virtual plane coordinate system is required to be established in advance. The real plane coordinate system is a two-dimensional coordinate system corresponding to an imaging plane under the fixed viewing angle, and the virtual plane coordinate system is a two-dimensional coordinate system corresponding to an imaging plane under the preset viewing angle. The preset viewing angle may be the second viewing angle.

Hereinafter the real plane coordinate system and the virtual plane coordinate system are illustrated in conjunction with FIG. 2 and FIG. 4b. In one embodiment, the fixed viewing angle of the real image collecting device shown in FIG. 2 corresponds to an imaging plane, a two-dimensional coordinate system uov is established for the imaging plane, and the two-dimensional coordinate system uov is the real plane coordinate system. In a same way, the second viewing angle of the virtual image collecting device shown in FIG. 4b corresponds to an imaging plane, a two-dimensional coordinate system $u_2 o_2 v_2$ is established for the imaging plane, and the two-dimensional coordinate system $u_2 o_2 v_2$ is the virtual plane coordinate system.

It should be noted that the real plane coordinate system is established only once, in a case that the real plane coordinate system in the second embodiment is same as the real plane coordinate system in the third embodiment.

To facilitate distinction, the image collecting device corresponding to the fixed viewing angle is called the real image collecting device, and the image collecting device corresponding to the second viewing angle is called the virtual image collecting device. For convenience, hereinafter in the embodiment, the right anterolateral vehicle of the target vehicle is abbreviated as the right-side vehicle.

In an implementation of the embodiment, a process of establishing the coordinate conversion relationship between the real plane coordinate system and the virtual plane coordinate system includes steps A2 to E2, where a sequence of steps A2 to E2 is not limited.

In step A2, a coordinate conversion relationship between the real plane coordinate system and a real device coordinate system is established. The real device coordinate system is a three-dimensional coordinate system established for the image collecting device in a case that the image collecting device is corresponding to the fixed viewing angle.

It should be noted that step A2 is same as step A1 in the second embodiment. One may refer to step A1 for relevant parts, which are not further described here. Moreover, there may be a case that only one of step A1 and step A2 is performed.

In step B2, a coordinate conversion relationship between the real device coordinate system and a real world coordinate system is established. The real world coordinate system is a world coordinate system established in a case that the image collecting device is corresponding to the fixed viewing angle.

It should be noted that step B2 is same as step B1 in the second embodiment. One may refer to step B1 for relevant parts, which are not further described here. Moreover, there may be a case that only one of step B1 and step B2 is performed.

In step C2, a coordinate conversion relationship between the real world coordinate system and a virtual world coordinate system is established. The virtual world coordinate system is a world coordinate system established in a case that the image collecting device is corresponding to the preset viewing angle.

In the embodiment, a world coordinate system $O_r{}^v X_r{}^v Y_r{}^v Z_r{}^v$ is established for the virtual image collecting device, and the world coordinate system $O_r{}^v X_r{}^v Y_r{}^v Z_r{}^v$ is defined as the virtual world coordinate system. In the embodiment, a position of an origin and directions of axes of the virtual world coordinate system $O_r{}^v X_r{}^v Y_r{}^v Z_r{}^v$ are not limited, as long as a position of the virtual world coordinate system $O_r{}^v X_r{}^v Y_r{}^v Z_r{}^v$ relative to the target vehicle does not change during driving of the target vehicle. For example, as shown in FIG. 4b, a certain point A of the virtual image collecting device may be acquired. Assuming that the virtual image collecting device is a camera, an optic center of the camera may be acquired as the point A. An intersection point between a perpendicular line crossing the point A (namely, a straight line crossing the point A and perpendicular to the ground plane) and the ground plane serves as the origin $O_r{}^v$ of the virtual world coordinate system $O_r{}^v X_r{}^v Y_r{}^v Z_r{}^v$. As for axis $X_r{}^v$, axis $Y_r{}^v$ and axis $Z_r{}^v$ of the virtual world coordinate system $O_r{}^v X_r{}^v Y_r{}^v Z_r{}^v$, the axis $X_r{}^v$ may point to the rear of the target vehicle, the axis $Z_r{}^v$ may point to the right of the target vehicle, and the axis $Y_r{}^v$ is perpendicular to the axis $X_r{}^v$ and the axis $Z_r{}^v$ and points to the ground. For another example, the position of the origin $O_r{}^v$, the direction of the axis $X_r{}^v$, the direction of the axis $Y_r{}^v$, and the direction of the axis $Z_r{}^v$ are four coordinate elements as shown in FIG. 4b, and one or more of the coordinate elements may be changed. As an example, a certain point on the target vehicle may serve as the aforementioned A, the directions of the axis $X_r{}^v$, the axis $Y_r{}^v$ and the axis $Z_r{}^v$ shown in FIG. 4b may be changed, In one embodiment, may be reversed, and a changed coordinate system serves as the virtual world coordinate system $O_r{}^v X_r{}^v Y_r{}^v Z_r{}^v$.

It should be noted that, with respect to the real image collecting device, the virtual image collecting device should be moved by S (S>0) meters towards the head of the vehicle, so that the virtual image is capable to cover a right region of the real image as much as possible.

The real world coordinate system $O_w XYZ$ shown in FIG. 2 and the virtual world coordinate system $O_r{}^v X_r{}^v Y_r{}^v Z_r{}^v$ shown in FIG. 4b are taken as an example. For the arbitrary point P in real 3D space, the coordinate in the real world coordinate system $O_w XYZ$ is $p(x_w, y_w, z_w)$, and the point P is a space point is a right region of the target vehicle in a case that $x_w > 0$. A coordinate conversion equation to convert $p(x_w, y_w, z_w)$ into the coordinate $p(x_r{}^v, y_r{}^v, z_r{}^v)$ in the virtual world coordinate system $O_r{}^v X_r{}^v Y_r{}^v Z_r{}^v$ is:

$$x_r{}^v = z_w - s$$

$$y_r{}^v = y_w$$

$$z_r{}^v = x_w \qquad (6)$$

The equation (6) describes the coordinate conversion relationship between the real world coordinate system $O_w XYZ$ and the virtual world coordinate system $O_r{}^v X_r{}^v Y_r{}^v Z_r{}^v$.

In step D2, a coordinate conversion relationship between the virtual world coordinate system and a virtual device coordinate system is established. The virtual device coordinate system is a three-dimensional coordinate system established for the image collecting device in a case that the image collecting device is corresponding to the preset viewing angle.

In the embodiment, a three-dimensional coordinate system $O_r{}^{vc} X_r{}^{vc} Y_r{}^{vc} Z_r{}^{vc}$ is set for the virtual image collecting device, and the three-dimensional coordinate system $O_r{}^{vc} X_r{}^{vc} Y_r{}^{vc} Z_r{}^{vc}$ is defined as the virtual device coordinate system. In the embodiment, a position of an origin and directions of axes of the virtual device coordinate system $O_r{}^{vc} X_r{}^{vc} Y_r{}^{vc} Z_r{}^{vc}$ are not limited, as long as a position of the virtual device coordinate system $O_r{}^{vc} X_r{}^{vc} Y_r{}^{vc} Z_r{}^{vc}$ relative to the virtual image collecting device does not change during driving of the target vehicle. For example, as shown in FIG. 4b, the virtual device coordinate system $O_r{}^{vc} X_r{}^{vc} Y_r{}^{vc} Z_r{}^{vc}$ is established by setting an optic center of the virtual image collecting device as the origin $O_r^{vc}$, axis $Z_r^{vc}$ coincides with an optic axis of the virtual image collecting device, axis $X_r^{vc}$ points to the rear of the target vehicle, and axis $Y_r^{vc}$ points to the ground.

For the arbitrary point P in real 3D space, a conversion relationship between the coordinate $p(x_r^{vc}, y_r^{vc}, z_r^{vc})$ in the virtual device coordinate system $O_r^{vc}X_r^{vc}Y_r^{vc}Z_r^{vc}$ and the coordinate $p(x_r^{v}, y_r^{v}, z_r^{v})$ in the virtual world coordinate system $O_r^{v}X_r^{v}Y_r^{v}Z_r^{v}$ is as follows:

$$\begin{pmatrix} x_r^{vc} \\ y_r^{vc} \\ z_r^{vc} \end{pmatrix} = R \begin{pmatrix} x_r^{v} \\ y_r^{v} \\ z_r^{v} \end{pmatrix} \quad (7)$$

R is a rotation matrix.

The equation (7) describes the coordinate conversion relationship between the virtual world coordinate system $O_r^{v}X_r^{v}Y_r^{v}Z_r^{v}$ and the virtual device coordinate system $O_r^{vc}X_r^{vc}Y_r^{vc}Z_r^{vc}$.

In step E2, a coordinate conversion relationship between the virtual device coordinate system and the virtual plane coordinate system is established.

As shown in FIG. 4b, the coordinate in the virtual device coordinate system $O_r^{vc}X_r^{vc}Y_r^{vc}Z_r^{vc}$ of the arbitrary point P in real 3D space is $p(x_r^{vc}, y_r^{vc}, z_r^{vc})$. In a case the point P is in the virtual image, there is a unique point p(u2, v2) corresponding to the point P in the virtual plane coordinate system $u_2o_2v_2$, and a corresponding relationship can be described as:

$$(u2,v2)=F(x_r^{vc},y_r^{vc},z_r^{vc}) \quad (8)$$

F is a projection model of the virtual image collecting device. Because the virtual image collecting device is the image collecting device acquired by changing the viewing angle of the real image collecting device, the projection model is determined by the interior parameter of the real image collecting device, and the interior parameter of the real image collecting device may be acquired by the off-line calibration algorithm.

The equation (8) describes the coordinate conversion relationship between the virtual device coordinate system $O_r^{vc}X_r^{vc}Y_r^{vc}Z_r^{vc}$ and the virtual plane coordinate system $u_2o_2v_2$. In equation (8), the projection model F is:

$$u2 = f_{x2} \frac{x_r^{vc}}{z_r^{vc}} + u_{02}$$

$$v2 = f_{y2} \frac{x_r^{vc}}{z_r^{vc}} + v_{02}$$

where $f_{x2} = \frac{f}{dx_{c2}}, f_{y2} = \frac{f}{dy_{c2}},$ f is a focal length of the virtual image collecting device, $dx_{c2}$ and $dy_{c2}$ are physical dimensions of a width and a height, respectively, of a single pixel of the virtual image collecting device, $u_{02}$ and $v_{02}$ are interior parameters of the virtual image collecting device, and $(u_{02}, v_{02})$ is the pixel coordinate of an intersection point between the optic axis of the virtual image collecting device and the imaging plane.

In the embodiment, a height h of the origin $O_r^{vc}$ of the virtual device coordinate system $O_r^{vc}X_r^{vc}Y_r^{vc}Z_r^{vc}$ from the ground plane may be measured in advance, and the virtual device coordinate system $O_r^{vc}X_r^{vc}Y_r^{vc}Z_r^{vc}$ may be treated as being acquired by rotating the virtual world coordinate system $O_r^{v}X_r^{v}Y_r^{v}Z_r^{v}$ sequentially by $\alpha$ degrees along the axis $X_r^{v}$, by $\beta$ degrees along the axis $Y_r^{v}$, and by $\gamma$ degrees along the axis $Z_r^{v}$. After the position of the virtual image collecting device relative to the target vehicle is fixed, $\alpha$, $\beta$ and $\gamma$ have fixed values and can be determined by an exterior parameter calibration algorithm. Such parameters can be used to determine the matrix R in the equation (7).

It should be noted that, when converting is performed between a 2D image and a 3D image via the virtual image collecting device, it is required that an image within a close range of the target vehicle is clear in the embodiment, so as to ensure an imaging effect of the virtual image. Hence, a small focal length is required to be set. For example, the focal length f of the virtual image collecting device is set to be 1. To further ensure image definition, the physical dimensions of the width and the height of the single pixel is required to be large. For example, $dx_{c2}$ and $dy_{c2}$ are 100. Moreover, a small 3D depth may be set. For example, the 3D depth Z is set to be 1.

Therefore, the coordinate conversion relationship between the real plane coordinate system and the virtual plane coordinate system are established by establishing a series of the aforementioned coordinate conversion relationships.

Based on the above, in an implementation of the embodiment, the operation of generating the virtual image based on the real image in step S102 of the first embodiment may include: converting the real image to the virtual image according to the coordinate conversion relationship between the real plane coordinate system and the virtual plane coordinate system. In the implementation, coordinates of each pixel of the real image in the real plane coordinate system can be determined, and then the coordinate of the each pixel in the virtual plane coordinate system is calculated according to the aforementioned equations (1), (2), (6), (7), (8), so that coordinate position of pixels in the real image are converted to generate the virtual image.

It can be appreciated that, a shape of a wheel of the right-side vehicle in the real image varies as a relative position between the right-side vehicle and the target vehicle varies. Particularly, the real image of the wheel of the right-side vehicle includes few features when the right-side vehicle and the target vehicle are too close. However, the virtual image of the wheel has more features, and the wheels corresponding to different relative positions have similar shapes when using different second viewing angles. Namely, the embodiment is not limited by the relative position between the target vehicle and the right-side vehicle, and the similar shapes of the wheels of the right-side vehicle can be detected as long as a proper second viewing angle is used, thereby facilitating determination of a position of the right-side vehicle.

Figure 10:
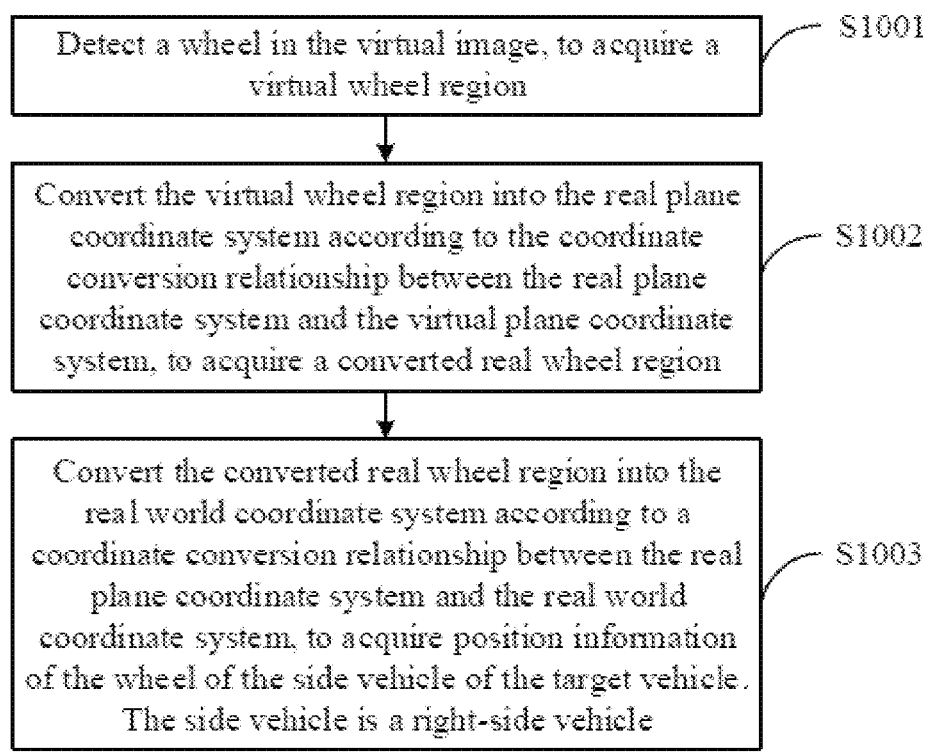
FIG. 10 is a schematic flowchart of a method for determining position information of a right-side vehicle according to an embodiment of the present disclosure.

Based on the above, in an implementation of the embodiment, the operation of determining position information of a side vehicle of the target vehicle based on the virtual image in step S102 of the first embodiment may include: determining the position information of the right-side vehicle via a detecting result of the wheel of the right-side vehicle, and may include steps S1001 to S1003 as shown in FIG. 10.

In step S1001, a wheel in the virtual image is detected to acquire a virtual wheel region.

The wheel in the virtual region serves as a region of interest (ROI) to be detected. In the embodiment, the detected ROI of the wheel is called the virtual wheel region.

In one implementation, step S1001 may include: detecting the wheel in the virtual image by using a wheel recognition model. In the implementation, it is required to collect in advance a large quantity of vehicle sample images including the wheel, and learn a wheel feature in the large quantity of vehicle sample images to acquire the wheel recognition model used for recognizing the wheel. In such case, after the virtual image is generated, the wheel recognition model can be used to detect the wheel in the virtual image.

It should be noted that the wheel recognition model is required in both the second embodiment and the third embodiment. The wheel recognition model is required to be trained only once, in a case that the wheel recognition model in the second embodiment is same as the wheel recognition model in the third embodiment. It is understood that the wheel recognition model may be trained respectively for the left-side vehicle and the right-side vehicle.

In one implementation, a sliding window may be used in a detection region of the virtual image, to collect a wheel sample and perform detection. As shown in FIG. 7, the right anterolateral region is required to be detected in the embodiment, and a step size may be set as 0.3 m or other lengths in both lateral and longitudinal directions. The wheel sample collected by the sliding window is acquired, and the detecting result of the wheel in each frame of collected images is acquired by using the wheel recognition model.

In step S1002, the virtual wheel region is converted into the real plane coordinate system according to the coordinate conversion relationship between the real plane coordinate system and the virtual plane coordinate system, to acquire a converted real wheel region.

In the implementation, the coordinate of each pixel of the virtual wheel region in the virtual plane coordinate system can be determined, and then the coordinate of the each pixel in the real plane coordinate system is calculated according to the aforementioned equations (1), (2), (6), (7) and (8), so that coordinate position of pixels in the virtual image are converted, thereby acquiring the converted real wheel region.

In step S1003, the converted real wheel region is converted into the real world coordinate system according to a coordinate conversion relationship between the real plane coordinate system and the real world coordinate system, to acquire position information of the wheel of the side vehicle of the target vehicle, where the side vehicle is the right-side vehicle.

In the implementation, the coordinate of each pixel of the converted real wheel region in the real plane coordinate system can be determined, and then the coordinate of the each pixel in the real word coordinate system are calculated according to the aforementioned equations (1), (2), (6), (7) and (8), namely, the coordinate of the wheel of the right-side vehicle in the real word coordinate system is determined. When the coordinate of the wheel of the right-side vehicle in the real word coordinate system is determined, the position of the right-side vehicle relative to the target vehicle can be determined according to a position relationship between the right-side vehicle and the wheel of the right-side vehicle.

In practice, in a case that the embodiment is applied to an FCW system of the target vehicle, a driver may be warned with light, sound, vibration and the like, when it is determined that the right-side vehicle and the target vehicle are close to each other. In a case that the embodiment is applied to an ACC system of the target vehicle, a distance between the target vehicle and the right-side vehicle may be controlled when it is determined that the right-side vehicle and the target vehicle are close to each other, so as to ensure driving safety of the target vehicle.

Further, in the aforementioned step S1001, there may be some misrecognition in the detecting result in a case that the wheel recognition model is used to detect the wheel in the virtual image, which results in a non-wheel region in region images acquired in step S1002. Hence, optic flow tracking is further performed in real time on the wheel of the side vehicle of the target vehicle, to acquire a real wheel region at the current moment. That is, a real wheel region acquired by the optic-flow-tracking is obtained, so as to use the real wheel region acquired by the optic-flow-tracking to remove the non-wheel region acquired in step S1002.

The acquiring the real wheel region at the current moment, i.e., the real wheel region acquired by the optic-flow-tracking may include: performing edge supplement on an optic flow tracking image at the current moment and acquiring the real wheel region of the wheel of the side vehicle based on the supplemented optic flow tracking image. In one embodiment, a method of optic flow tracking does not have an ideal effect of tracing a target object located at a boundary of a tracking image. In the embodiment, the target object is the wheel of the right-side vehicle, and the wheel of the right-side vehicle appears, in most cases, at the right of the tracking image. Therefore, the edge supplement is performed on the tracking image in the embodiment. For example, a white region is added to an edge of the image, then the wheel is tracked in the supplemented image by using a pyramid LK (Lucas Kanade) optic flow method, and accuracy of a tracking result is improved.

Based on the above, in an implementation of the embodiment, the method after step S1002 may further includes: fusing the converted real wheel region and the real wheel region acquired by the optic flow tracking, to acquire a fused real wheel region. In the implementation, after the optic flow tracking result is acquired, the optic flow tracking result is fused with an image conversion result in step S1002. In this way, the non-wheel region in the image conversion result can be removed, then step S1003 is performed by using the fused real wheel region.

Further, there may still be a non-wheel region in the fused real wheel region. To ensure accuracy of the wheel detecting result, in an implementation of the embodiment, after acquiring the fused real wheel region, the method further includes: acquiring a final real wheel region corresponding to each of one or more sequential history moments before the current moment; and determining whether there is a non-wheel region in the fused real wheel region based on the final real wheel region corresponding to each of the one or more sequential history moments, and removing the non-wheel region in case that there is the non-wheel region in the fused real wheel region. In the implementation, a most recent detection moment or multiple sequential most recent moments before the current moment are acquired to use a manner of forward linkage. Such detection moments are all the history moments, for each of the history moments when serving as the current moment, the wheel of the right-side vehicle is detected based on the real image, thereby acquiring the final real wheel region. Because the current moment and the history moments form sequential moments, variation of the wheel at such series of the sequential moments can be determined based on the detected wheel region. Because variation of the position of the wheel should be continuous, it can be determined whether there is the non-wheel region in the fused real wheel region corresponding to the current moment, thereby removing the non-wheel region. Afterwards, step S1003 is performed by using the real wheel region acquired after a removing operation.

In summary, according to the embodiment, the real image can be converted to the virtual image via the coordinate conversion relationship, the wheel in the virtual image can be detected, and the position information of the right-side vehicle of the target vehicle is determined via the wheel detecting result. In one embodiment, the wheel region may be detected by a combination of manners such as machine learning, optic flow tracking, and linkage of images at multiple moments. The accuracy of the wheel detecting result is improved, and thereby accuracy of position detecting result of the right-side vehicle is improved.

Figure 11:
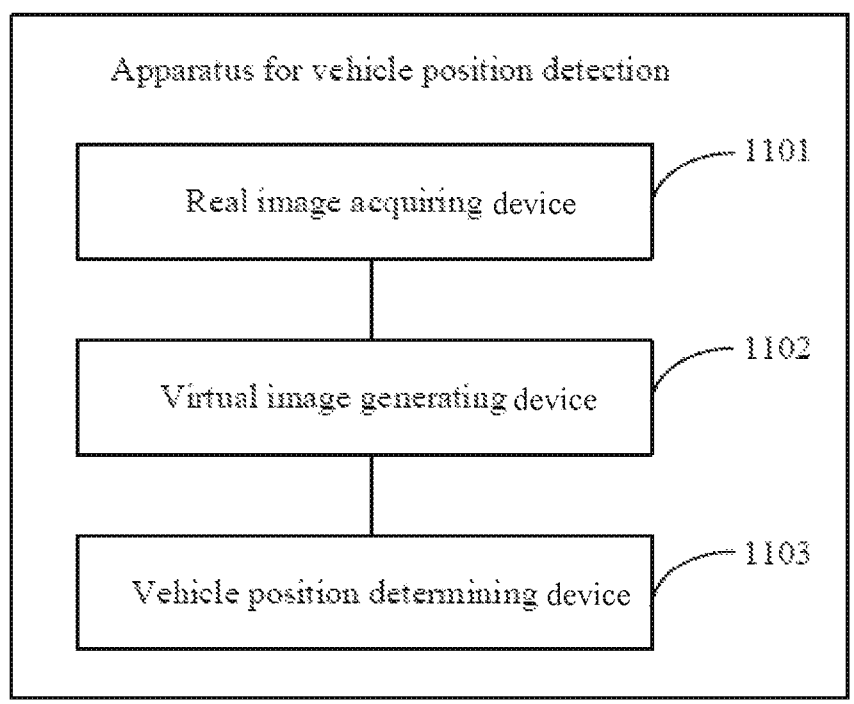
FIG. 11 is a schematic structural diagram of an apparatus for vehicle position detection according to an embodiment of the present disclosure.

Reference is made to FIG. 11, which is a schematic structure diagram of an apparatus for vehicle position detection according to an embodiment of the disclosure. The apparatus includes a real image acquiring device 1101, a virtual image generating device 1102, and a vehicle position determining device 1103.

The real image acquiring device 1101 is configured to acquire a real image of a region in front of a target vehicle. The real image is captured by an image collecting device installed on the target vehicle, and the real image is an image captured by the image collecting device at a current moment under a fixed viewing angle.

The virtual image generating device 1102 is configured to generate a virtual image based on the real image. The virtual image is an image captured by the image collecting device at the current moment under a preset viewing angle, and the preset viewing angle is a viewing angle acquired by rotating the fixed viewing angle by a preset angle in a horizontal direction.

The vehicle position determining device 1103 is configured to determine position information of a side vehicle of the target vehicle based on the virtual image.

In an implementation of the embodiment, the preset angle is a first angle or a second angle. A first viewing angle is a viewing angle acquired by rotating counterclockwise the fixed viewing angle by the first angle in the horizontal direction. A second viewing angle is a viewing angle acquired by rotating clockwise the fixed viewing angle by the second angle in the horizontal direction. The side vehicle of the target vehicle is a left-side vehicle of the target vehicle, in a case that the preset angle is the first angle. The side vehicle of the target vehicle is a right-side vehicle of the target vehicle, in a case that the preset angle is the second angle.

In an implementation of the embodiment, the apparatus further includes a conversion relationship establishing device configured to establish a coordinate conversion relationship between a real plane coordinate system and a virtual plane coordinate system. The real plane coordinate system is a two-dimensional coordinate system corresponding to an imaging plane under the fixed viewing angle. The virtual plane coordinate system is a two-dimensional coordinate system corresponding to an imaging plane under the preset viewing angle. The virtual image generating device 1102 is configured to convert the real image to the virtual image according to the coordinate conversion relationship between the real plane coordinate system and the virtual plane coordinate system.

In an implementation of the embodiment, the conversion relationship establishing device includes a first establishing sub-device, a second establishing sub-device, a third establishing sub-device, a fourth establishing sub-device and a fifth establishing sub-device The first establishing sub-device is configured to establish a coordinate conversion relationship between the real plane coordinate system and a real device coordinate system. The real device coordinate system is a three-dimensional coordinate system established for the image collecting device in a case that the image collecting device is corresponding to the fixed viewing angle.

The second establishing sub-device is configured to establish a coordinate conversion relationship between the real device coordinate system and a real world coordinate system. The real world coordinate system is a world coordinate system established in a case that the image collecting device is corresponding to the fixed viewing angle.

The third establishing sub-device is configured to establish a coordinate conversion relationship between the real world coordinate system and a virtual world coordinate system. The virtual world coordinate system is a world coordinate system established in a case that the image collecting device is corresponding to the preset viewing angle.

The fourth establishing sub-device is configured to establish a coordinate conversion relationship between the virtual world coordinate system and a virtual device coordinate system. The virtual device coordinate system is a three-dimensional coordinate system established for the image collecting device in a case that the image collecting device is corresponding to the preset viewing angle.

The fifth establishing sub-device is configured to establish a coordinate conversion relationship between the virtual device coordinate system and the virtual plane coordinate system.

In an implementation of the embodiment, the vehicle position determining device 1103 may include a virtual wheel detecting sub-device, a real wheel acquiring sub-device and a vehicle position determining sub-device.

The virtual wheel detecting sub-device is configured to detect a wheel in the virtual image, to acquire a virtual wheel region.

The real wheel acquiring sub-device is configured to convert the virtual wheel region into the real plane coordinate system according to the coordinate conversion relationship between the real plane coordinate system and the virtual plane coordinate system, to acquire a converted real wheel region.

The vehicle position determining sub-device is configured to convert the converted real wheel region into the real world coordinate system according to a coordinate conversion relationship between the real plane coordinate system and the real world coordinate system, to acquire position information of the wheel of the side of the target vehicle.

In an implementation of the embodiment, the apparatus further includes a recognition model establishing device configured to learn a wheel feature in a large quantity of vehicle sample images, to acquire a wheel recognition model used for recognizing the wheel. The virtual wheel detecting sub-device is configured to detect the wheel in the virtual image by using the wheel recognition model.

In an implementation of the embodiment, the apparatus further includes an optic flow tracking device configured to perform optic flow tracking on the wheel of the side vehicle of the target vehicle, to acquire a real wheel region at the current moment. The vehicle position determining device 1103 further includes a wheel fusing sub-device configured to fuse, after the converted real wheel region is acquired, the converted real wheel region and the real wheel region acquired by the optic flow tracking, to acquire a fused real wheel region.

In an implementation of the embodiment, the optic flow tracking device includes an optic flow tracking sub-device, an edge supplementing sub-device and a region acquiring sub-device. The optic flow tracking sub-device is configured to perform the optic flow tracking on the wheel of the side vehicle of the target vehicle. The edge supplementing sub-device is configured to perform edge supplement on an optic flow tracking image at the current moment. The region acquiring sub-device is configured to acquire the real wheel region of the wheel of the side vehicle based on the supplemented optic flow tracking image.

In an implementation of the embodiment, the vehicle position determining device 1103 further includes a history wheel acquiring sub-device and a region removing sub-device. The history wheel acquiring sub-device is configured to acquire, after the fused real wheel region is acquired, a final real wheel region corresponding to each of one or more sequential history moments before the current moment. The region removing sub-device is configured to determine whether there is a non-wheel region in the fused real wheel region based on the final real wheel region corresponding to each of the one or more sequential history moments, and remove the non-wheel region in case that there is the non-wheel region in the fused real wheel region.

Furthermore, an apparatus for vehicle position detection is provided according to an embodiment of the present disclosure. The apparatus includes a processor, a memory and a system bus. The processor and the memory are connected via the system bus. The memory is configured to store one or more programs. The one or more programs includes instructions, the instructions when being performed by the processor cause the processor to perform any one of above implementations of the method for vehicle position detection.

Furthermore, a computer-readable storage medium storing instructions is provided according to an embodiment of the present disclosure. The instructions when being executed on a terminal device cause the terminal device to perform any one of above implementations of the method for vehicle position detection.

Furthermore, a computer program product is provided according to an embodiment of the present disclosure. The computer program product when being executed on a terminal device causes the terminal device to perform any one of above implementations of the method for vehicle position detection.

The software product may be stored in a storage medium, such as a ROM/RAM, a magnetic disk, and an optic disk, and include multiple instructions so as to make a computer device (which may be a personal computer, a server, or a communication device such as a media gateway) perform the method described in each embodiment or some parts of the embodiments of the present disclosure.

It should be noted that the embodiments of the present disclosure are described in a progressive manner, and each embodiment places emphasis on the difference from other embodiments. Therefore, one embodiment can refer to other embodiments for the same or similar parts. Since the apparatus disclosed in the embodiments corresponds to the method disclosed in the embodiments, the description of the apparatus is simple, and reference may be made to the relevant part of the method.

It should be further noted that, the relationship terms such as "first", "second" and the like are only used herein to distinguish one entity or operation from another, rather than to necessitate or imply that an actual relationship or order exists between the entities or operations. Furthermore, the terms such as "include", "comprise" or any other variants thereof means to be non-exclusive. Therefore, a process, a method, an article or a device including a series of elements include not only the disclosed elements but also other elements that are not clearly enumerated, or further include inherent elements of the process, the method, the article or the device. Unless expressively limited, the statement "including a . . . " does not exclude the case that other similar elements may exist in the process, the method, the article or the device other than enumerated elements.

The above description of the embodiments herein enables those skilled in the art to implement or use the present disclosure. Numerous modifications to the embodiments are apparent to those skilled in the art, and the general principles defined herein can be implemented in other embodiments without deviating from the spirit or scope of the present disclosure. Therefore, the present disclosure is not limited to the embodiments described herein, but is to conform to the widest scope consistent with the principles and novel features disclosed herein.

The invention claimed is:

1. A method for vehicle position detection, comprising:
   acquiring a real image of a region in front of a target vehicle, wherein the real image is captured by an image collecting device installed on the target vehicle, and the real image is an image captured by the image collecting device at a current moment under a fixed viewing angle; and
   generating a virtual image based on the real image, and determining position information of a side vehicle of the target vehicle based on the virtual image, wherein the virtual image is an image captured by the image collecting device at the current moment under a preset viewing angle, and the preset viewing angle is a viewing angle acquired by rotating the fixed viewing angle by a preset angle in a horizontal direction.

2. The method according claim 1, wherein the preset angle is a first angle or a second angle, a first viewing angle is a viewing angle acquired by rotating counterclockwise the fixed viewing angle by the first angle in the horizontal direction, and a second viewing angle is a viewing angle acquired by rotating clockwise the fixed viewing angle by the second angle in the horizontal direction; and
   the side vehicle of the target vehicle is a left-side vehicle of the target vehicle, in a case that the preset angle is the first angle; and the side vehicle of the target vehicle is a right-side vehicle of the target vehicle, in a case that the preset angle is the second angle.

3. The method according to claim 1, further comprising:
   establishing a coordinate conversion relationship between a real plane coordinate system and a virtual plane coordinate system, wherein the real plane coordinate system is a two-dimensional coordinate system corresponding to an imaging plane under the fixed viewing angle, and the virtual plane coordinate system is a two-dimensional coordinate system corresponding to an imaging plane under the preset viewing angle;
   wherein the generating the virtual image based on the real image comprises:
   converting the real image to the virtual image according to the coordinate conversion relationship between the real plane coordinate system and the virtual plane coordinate system.

4. The method according to claim 3, wherein the establishing the coordinate conversion relationship between the real plane coordinate system and the virtual plane coordinate system comprises:
   establishing a coordinate conversion relationship between the real plane coordinate system and a real device coordinate system, wherein the real device coordinate system is a three-dimensional coordinate system established for the image collecting device in a case that the image collecting device is corresponding to the fixed viewing angle;

establishing a coordinate conversion relationship between the real device coordinate system and a real world coordinate system, wherein the real world coordinate system is a world coordinate system established in a case that the image collecting device is corresponding to the fixed viewing angle;

establishing a coordinate conversion relationship between the real world coordinate system and a virtual world coordinate system, wherein the virtual world coordinate system is a world coordinate system established in a case that the image collecting device is corresponding to the preset viewing angle;

establishing a coordinate conversion relationship between the virtual world coordinate system and a virtual device coordinate system, wherein the virtual device coordinate system is a three-dimensional coordinate system established for the image collecting device in a case that the image collecting device is corresponding to the preset viewing angle; and establishing a coordinate conversion relationship between the virtual device coordinate system and the virtual plane coordinate system.

5. The method according to claim 4, wherein the determining the position information of the side vehicle of the target vehicle based on the virtual image comprises:

detecting a wheel in the virtual image, to acquire a virtual wheel region;

converting the virtual wheel region into the real plane coordinate system according to the coordinate conversion relationship between the real plane coordinate system and the virtual plane coordinate system, to acquire a converted real wheel region; and converting the converted real wheel region into the real world coordinate system according to a coordinate conversion relationship between the real plane coordinate system and the real world coordinate system, to acquire position information of the wheel of the side vehicle of the target vehicle.

6. The method according to claim 5, further comprising:
learning a wheel feature in a large quantity of vehicle sample images, to acquire a wheel recognition model used for recognizing the wheel;

wherein the detecting the wheel in the virtual image comprises:

detecting the wheel in the virtual image by using the wheel recognition model.

7. The method according to claim 5, further comprising:
performing optic flow tracking on the wheel of the side vehicle of the target vehicle, to acquire a real wheel region at the current moment;

wherein after acquiring the converted real wheel region, the method further comprises:

fusing the converted real wheel region and the real wheel region acquired by the optic flow tracking, to acquire a fused real wheel region.

8. The method according to claim 7, wherein the acquiring the real wheel region at the current moment comprises:

performing edge supplement on an optic flow tracking image at the current moment; and acquiring the real wheel region of the wheel of the side vehicle based on the supplemented optic flow tracking image.

9. The method according to claim 7, wherein after acquiring the fused real wheel region, the method further comprises:

acquiring a final real wheel region corresponding to each of one or more sequential history moments before the current moment; and determining whether there is a non-wheel region in the fused real wheel region based on the final real wheel region corresponding to each of the one or more sequential history moments, and removing the non-wheel region in case that there is the non-wheel region in the fused real wheel region.

10. The method according to claim 1, wherein:

the real image does not include a feature effective for recognizing the side vehicle, and the virtual image includes the feature effective for recognizing the side vehicle; and the preset angle is adjusted in real time for capturing the feature effective for recognizing the side vehicle.

11. An apparatus for vehicle position detection comprising a processor, a memory for storing program instructions, and a system bus, wherein the processor and the memory are connected via the system bus, and the processor executes the program instructions to:

acquire a real image of a region in front of a target vehicle, wherein the real image is captured by an image collecting device installed on the target vehicle, and the real image is an image captured by the image collecting device at a current moment under a fixed viewing angle;

generate a virtual image based on the real image, wherein the virtual image is an image captured by the image collecting device at the current moment under a preset viewing angle, and the preset viewing angle is a viewing angle acquired by rotating the fixed viewing angle by a preset angle in a horizontal direction; and determine position information of a side vehicle of the target vehicle based on the virtual image.

12. The apparatus according to claim 11, wherein the preset angle is a first angle or a second angle, a first viewing angle is a viewing angle acquired by rotating counterclockwise the fixed viewing angle by the first angle in the horizontal direction, and a second viewing angle is a viewing angle acquired by rotating clockwise the fixed viewing angle by the second angle in the horizontal direction; and the side vehicle of the target vehicle is a left-side vehicle of the target vehicle, in a case that the preset angle is the first angle; and the side vehicle of the target vehicle is a right-side vehicle of the target vehicle, in a case that the preset angle is the second angle.

13. The apparatus according to claim 11, wherein the processor executes the program instructions further to:

establish a coordinate conversion relationship between a real plane coordinate system and a virtual plane coordinate system, wherein the real plane coordinate system is a two-dimensional coordinate system corresponding to an imaging plane under the fixed viewing angle, and the virtual plane coordinate system is a two-dimensional coordinate system corresponding to an imaging plane under the preset viewing angle; and convert the real image to the virtual image according to the coordinate conversion relationship between the real plane coordinate system and the virtual plane coordinate system.

14. The apparatus according to claim 13, wherein the processor executes the program instructions further to:

establish a coordinate conversion relationship between the real plane coordinate system and a real device coordinate system, wherein the real device coordinate system is a three-dimensional coordinate system established for the image collecting device in a case that the image collecting device is corresponding to the fixed viewing angle;

establish a coordinate conversion relationship between the real device coordinate system and a real world coordinate system, wherein the real world coordinate system is a world coordinate system established in a case that the image collecting device is corresponding to the fixed viewing angle;

establish a coordinate conversion relationship between the real world coordinate system and a virtual world coordinate system, wherein the virtual world coordinate system is a world coordinate system established in a case that the image collecting device is corresponding to the preset viewing angle;

establish a coordinate conversion relationship between the virtual world coordinate system and a virtual device coordinate system, wherein the virtual device coordinate system is a three-dimensional coordinate system established for the image collecting device in a case that the image collecting device is corresponding to the preset viewing angle; and establish a coordinate conversion relationship between the virtual device coordinate system and the virtual plane coordinate system.

15. The apparatus according to claim 14, wherein the processor executes the program instructions further to:
   detect a wheel in the virtual image, to acquire a virtual wheel region;
   convert the virtual wheel region into the real plane coordinate system according to the coordinate conversion relationship between the real plane coordinate system and the virtual plane coordinate system, to acquire a converted real wheel region; and
   convert the converted real wheel region into the real world coordinate system according to a coordinate conversion relationship between the real plane coordinate system and the real world coordinate system, to acquire position information of the wheel of the side vehicle of the target vehicle.

16. The apparatus according to claim 15, wherein the processor executes the program instructions further to:
   learn a wheel feature in a large quantity of vehicle sample images, to acquire a wheel recognition model used for recognizing the wheel; and
   detect the wheel in the virtual image by using the wheel recognition model.

17. The apparatus according to claim 15, wherein the processor executes the program instructions further to:
   perform optic flow tracking on the wheel of the side vehicle of the target vehicle, to acquire a real wheel region at the current moment; and
   fuse, after the converted real wheel region is acquired, the converted real wheel region and the real wheel region acquired by the optic flow tracking, to acquire a fused real wheel region.

18. The apparatus according to claim 17, wherein the processor executes the program instructions further to:
   perform the optic flow tracking on the wheel of the side vehicle of the target vehicle;
   perform edge supplement on an optic flow tracking image at the current moment; and
   acquire the real wheel region of the wheel of the side vehicle based on the supplemented optic flow tracking image.

19. The apparatus according to claim 17, wherein the processor executes the program instructions further to:
   acquire, after the fused real wheel region is acquired, a final real wheel region corresponding to each of one or more sequential history moments before the current moment; and
   determine whether there is a non-wheel region in the fused real wheel region based on the final real wheel region corresponding to each of the one or more sequential history moments, and remove the non-wheel region in case that there is the non-wheel region in the fused real wheel region.

20. A non-transitory computer-readable storage medium storing instructions, wherein the instructions when being executed on a terminal device cause the terminal device to:
   acquire a real image of a region in front of a target vehicle, wherein the real image is captured by an image collecting device installed on the target vehicle, and the real image is an image captured by the image collecting device at a current moment under a fixed viewing angle; and
   generate a virtual image based on the real image, and determine position information of a side vehicle of the target vehicle based on the virtual image, wherein the virtual image is an image captured by the image collecting device at the current moment under a preset viewing angle, and the preset viewing angle is a viewing angle acquired by rotating the fixed viewing angle by a preset angle in a horizontal direction.

* * * * *